(12) United States Patent
Zhai et al.

(10) Patent No.: US 10,747,951 B2
(45) Date of Patent: Aug. 18, 2020

(54) WEBPAGE TEMPLATE GENERATING METHOD AND SERVER

(71) Applicant: UC Mobile Co., Ltd., Beijing (CN)

(72) Inventors: Guangya Zhai, Beijing (CN); Haihong Zheng, Beijing (CN); Weiran Jiang, Beijing (CN); Xianggen Zhou, Beijing (CN)

(73) Assignee: UC Mobile Co., Ltd., Beijing (CN)

( * ) Notice: Subject to any disclaimer, the term of this patent is extended or adjusted under 35 U.S.C. 154(b) by 309 days.

(21) Appl. No.: 15/156,753

(22) Filed: May 17, 2016

(65) Prior Publication Data

US 2016/0335243 A1 Nov. 17, 2016

Related U.S. Application Data

(63) Continuation of application No. PCT/CN2014/087822, filed on Sep. 29, 2014.

(30) Foreign Application Priority Data

Nov. 26, 2013 (CN) .......................... 2013 1 0605106
Nov. 26, 2013 (CN) .......................... 2013 1 0612915

(51) Int. Cl.
*G06F 40/186* (2020.01)
*G06F 16/951* (2019.01)
(Continued)

(52) U.S. Cl.
CPC ........ *G06F 40/186* (2020.01); *G06F 16/2228* (2019.01); *G06F 16/951* (2019.01);
(Continued)

(58) Field of Classification Search
CPC ................................................ G06F 17/30705
See application file for complete search history.

(56) References Cited

U.S. PATENT DOCUMENTS 6,990,628 B1 * 1/2006 Palmer ................ G06F 17/2211
707/999.003
7,092,997 B1 * 8/2006 Kasriel ............... H04L 67/2895
709/213
(Continued)

FOREIGN PATENT DOCUMENTS

CN       101207605       6/2008
CN       101276362       10/2008
(Continued)

OTHER PUBLICATIONS

Thomas Gottron; Clustering Template Based Web Documents; 12 pages; 2008; Advances in Information Retrieval. ECIR 2008. Lecture Notes in Computer Science, vol. 4956, pp. 40-51; https://pdfs.semanticscholar.org/c5e2/2a2ace52892edb0e0897fa011788688dcece.pdf.*

(Continued)

*Primary Examiner* — Scott T Baderman
*Assistant Examiner* — Benjamin Smith
(74) *Attorney, Agent, or Firm* — Sheppard Mullin Richter & Hampton LLP

(57) ABSTRACT

Disclosed are a method of generating a webpage template and a server. The method of generating a webpage template comprises: collecting webpage data of a webpage, and generating a webpage template of the webpage according to the webpage data. By means of the present invention, the problem in the prior art that a method of generating a webpage template depends relatively strongly on a target website is solved, thereby reducing the dependence of the method of generating a webpage template on the target website.

17 Claims, 14 Drawing Sheets

(51) Int. Cl.
*G06F 16/958* (2019.01)
*G06F 16/22* (2019.01)
*G06F 16/957* (2019.01)
*H04L 29/06* (2006.01)

(52) U.S. Cl.
CPC .......... *G06F 16/957* (2019.01); *G06F 16/986* (2019.01); *H04L 69/04* (2013.01)

(56) References Cited

U.S. PATENT DOCUMENTS

| | | | | |
|---|---|---|---|---|
| 7,269,784 B1* | 9/2007 | Kasriel | G06F 16/9574 | 715/205 |
| 7,660,819 B1* | 2/2010 | Frieder | G06F 17/30687 | 707/999.107 |
| 7,676,465 B2* | 3/2010 | Poola | G06F 40/186 | 707/999.005 |
| 7,680,858 B2* | 3/2010 | Poola | G06F 17/3071 | 707/736 |
| 7,765,274 B2* | 7/2010 | Kasriel | H04L 67/2895 | 709/203 |
| 7,792,951 B2* | 9/2010 | Halim | G06F 17/3071 | 709/223 |
| 8,037,084 B2* | 10/2011 | Kim | G06F 17/30905 | 707/758 |
| 8,165,974 B2* | 4/2012 | Privault | G06N 5/043 | 706/12 |
| 8,239,387 B2* | 8/2012 | Madaan | G06F 16/355 | 707/737 |
| 8,254,698 B2* | 8/2012 | Kantor | G06K 9/6201 | 382/112 |
| 8,422,786 B2* | 4/2013 | Chenthamarakshan | G06K 9/00442 | 382/173 |
| 8,543,520 B2* | 9/2013 | Diao | G01C 21/20 | 706/12 |
| 8,543,576 B1* | 9/2013 | Buryak | G06F 17/30707 | 707/737 |
| 8,650,196 B1* | 2/2014 | Zhou | G06F 17/30705 | 707/737 |
| 8,694,459 B2* | 4/2014 | Zadeh | G06N 7/02 | 706/48 |
| 8,965,896 B2* | 2/2015 | Mizuguchi | G06F 17/30598 | 707/738 |
| 9,020,947 B2* | 4/2015 | Yan | G06F 17/30867 | 707/738 |
| 9,292,579 B2* | 3/2016 | Madhani | G06F 16/24 | |
| 9,292,704 B2* | 3/2016 | Ueno | G06F 21/6218 | |
| 9,317,622 B1* | 4/2016 | Zuromski | G06F 16/9577 | |
| 2002/0188631 A1* | 12/2002 | Tiemann | G06F 17/24 | 715/234 |
| 2004/0111504 A1* | 6/2004 | Halim | G06F 17/3071 | 709/223 |
| 2004/0249824 A1* | 12/2004 | Brockway | G06F 17/3061 | |
| 2005/0060643 A1* | 3/2005 | Glass | G06F 17/241 | 715/205 |
| 2006/0031379 A1* | 2/2006 | Kasriel | H04L 67/2895 | 709/213 |
| 2007/0112867 A1* | 5/2007 | Evans | G06F 17/3071 | |
| 2007/0112898 A1* | 5/2007 | Evans | G06F 17/30705 | |
| 2008/0010291 A1* | 1/2008 | Poola | G06F 17/3071 | |
| 2008/0010292 A1* | 1/2008 | Poola | G06F 17/2211 | |
| 2008/0082531 A1* | 4/2008 | Suarez | G06F 17/3071 | |
| 2008/0288515 A1* | 11/2008 | Kim | G06F 17/30905 | |
| 2009/0019133 A1 | 1/2009 | Brimley | | |
| 2009/0157657 A1* | 6/2009 | Kim | G06F 17/30905 | |
| 2009/0169110 A1* | 7/2009 | Masuyama | G06F 17/30613 | 382/198 |
| 2009/0216708 A1* | 8/2009 | Madaan | G06F 17/3071 | |
| 2009/0259649 A1* | 10/2009 | Poola | G06F 17/30887 | |
| 2009/0287668 A1* | 11/2009 | Evans | G06F 17/3071 | |
| 2010/0169311 A1* | 7/2010 | Tengli | G06F 17/30864 | 707/736 |
| 2010/0169329 A1* | 7/2010 | Frieder | G06F 17/30687 | 707/752 |
| 2010/0254615 A1* | 10/2010 | Kantor | G06K 9/6201 | 382/218 |
| 2010/0312725 A1* | 12/2010 | Privault | G06N 5/043 | 706/12 |
| 2011/0173197 A1* | 7/2011 | Mehta | G06F 17/30705 | 707/737 |
| 2011/0235909 A1* | 9/2011 | Chenthamarakshan | G06K 9/00442 | 382/173 |
| 2011/0238746 A1* | 9/2011 | Chess | G06F 16/9574 | 709/203 |
| 2012/0232788 A1* | 9/2012 | Diao | G01C 21/20 | 701/426 |
| 2012/0259855 A1* | 10/2012 | Mizuguchi | G06F 17/3071 | 707/739 |
| 2013/0031470 A1* | 1/2013 | Daly, Jr. | G06F 17/30867 | 715/243 |
| 2013/0138655 A1* | 5/2013 | Yan | G06F 17/30702 | 707/738 |
| 2013/0247215 A1* | 9/2013 | Ueno | G06F 21/6218 | 726/27 |
| 2013/0330008 A1* | 12/2013 | Zadeh | G06N 7/02 | 382/195 |
| 2013/0339840 A1* | 12/2013 | Jain | G06F 17/2247 | 715/234 |
| 2014/0201126 A1* | 7/2014 | Zadeh | G06K 9/627 | 706/52 |
| 2014/0280167 A1* | 9/2014 | Ghessassi | G06K 9/00483 | 707/738 |
| 2014/0379839 A1* | 12/2014 | Dou | G06F 16/9574 | 709/213 |
| 2015/0019943 A1* | 1/2015 | Ying | G06F 17/248 | 715/204 |
| 2015/0019957 A1* | 1/2015 | Ying | G06F 17/248 | 715/243 |
| 2015/0019958 A1* | 1/2015 | Ying | G06F 17/211 | 715/243 |
| 2015/0058362 A1* | 2/2015 | Manohar | G06Q 50/01 | 707/749 |
| 2015/0081681 A1* | 3/2015 | Vohra | G06F 7/24 | 707/723 |
| 2015/0127659 A1* | 5/2015 | Madhani | G06K 9/00442 | 707/748 |
| 2017/0308517 A1* | 10/2017 | Josifovski | G06F 17/30699 | |

FOREIGN PATENT DOCUMENTS

| | | |
|---|---|---|
| CN | 101727500 | 6/2010 |
| CN | 101807209 | 8/2010 |
| CN | 101916285 | 12/2010 |
| CN | 101950312 | 1/2011 |
| CN | 102012821 A | 4/2011 |
| CN | 102073670 A | 5/2011 |
| CN | 102170438 | 8/2011 |
| CN | 102298617 | 12/2011 |
| CN | 102819591 A | 12/2012 |
| CN | 103024013 | 4/2013 |
| CN | 103605770 A | 2/2014 |
| CN | 103618787 | 3/2014 |
| CN | 103685476 A | 3/2014 |
| WO | 0223401 | 3/2002 |
| WO | 2013017009 | 2/2013 |
| WO | 2015078231 | 6/2015 |

OTHER PUBLICATIONS

Thamme Gowda and Chris Mattmann; Clustering Web Pages Based on Structure and Style Similarity; 6 pages; 2016 IEEE 17th International Conference on Information Reuse and Integration (IRI), Jul. 28-30, 2016.*

Office Action for Chinese Application No. 201310605106.X, dated Jun. 19, 2017 (with English Translation), 23 pages.

(56) References Cited

OTHER PUBLICATIONS

International Search Report and Written Opinion for PCT/CN2014/087822, dated Dec. 9, 2014, 9 pages.
International Preliminary Report for PCT App. No. PCT/CN/2014/078718, dated May 31, 2016, 11 pages.
International Preliminary Report for PCT App. No. PCT/CN/2014/087822, dated May 31, 2016, 5 pages.
International Search Report for PCT App. No. PCT/CN/2014/078718, dated Sep. 2, 2014, 6 pages.
International Search Report for PCT App. No. PCT/CN/2014/087822, dated Dec. 9, 2014, 2 pages.
OA for CN App. No. 201310605106.X, dated Jan. 4, 2017, 31 pages.
OA for CN App. No. 201310605106.X, dated May 3, 2016, 11 pages.
OA for CN App. No. 201310612912.X, dated Mar. 28, 2016, 12 pages.
OA for CN App. No. 201310612912.X, dated Sep. 19, 2016, 15 pages.
OA for CN App. No. 201310612915.3, dated Apr. 1, 2016, 10 pages.
OA for CN App. No. 201310612915.3, dated Sep. 26, 2016, 10 pages.
OA for CN App. No. 201310612915.3, dated Dec. 28, 2016, 12 pages.
Search Report for CN App. No. 201310605106.X dated Apr. 21, 2016, 2 pages.
Search Report for CN App. No. 201310612912.X dated Mar. 16, 2016, 2 pages.
Search Report for CN App. No. 201310612915.3 dated Mar. 1, 2016, 2 pages.
Written Opinion for PCT App. No. PCT/CN/2014/078718, dated Sep. 2, 2014, 18 pages.
Written Opinion for PCT App. No. PCT/CN/2014/087822, dated Dec. 9, 2014, 7 pages.

* cited by examiner

WEBPAGE TEMPLATE GENERATING METHOD AND SERVER

CROSS-REFERENCE TO RELATED APPLICATION

This application is a continuation application of International Application No. PCT/CN2014/087822, filed Sep. 29, 2014, which is based upon and claims priority to Chinese Patent Application No. 201310612915.3, filed Nov. 26, 2013 and Chinese Patent Application No. 201310605106.X, filed Nov. 26, 2013. The entire contents of the above referenced applications are incorporated herein by reference.

TECHNICAL FIELD

The present invention relates to the field of mobile browsers, and more particularly, to a method and a server for generating a webpage template.

BACKGROUND

With respect to webpage browsing, a compression technology is proposed in the conventional technology, which, by extending an HTTP request, allows a website to provide a template and an incremental file, and when a client accesses the same template webpage, it is only necessary to download the template for the first time, it is only necessary to download the incremental file for other requests, and an original page is reconstructed by using the incremental file and a template file, thereby reducing the traffic of access to the client. Therefore, the technology can use the same part among multiple webpages to compress the traffic.

The inventors find that the defect of the technology lies in that a target website has to support the protocol, the dependence on the target website is relatively strong, and the target website is required to provide a template and a corresponding incremental file on its own, which is also one of the reasons why the compression technology cannot be widely used.

In addition, the manner of automatically generating a template in the prior art is mainly based on parsing a webpage DOM (Document Object Model) tree structure and extracting a common part. The method has a large calculation amount, difficulty in extracting templates, and poor compatibility. Moreover, the existing common template generation program is for a single website, and the processing scale is small.

When a user browses a webpage, a terminal device needs to receive a great number of webpage data sent by a server, to implement webpage display. A significant amount of repeated data often exists among the displayed webpages; each time the user browses the webpages having the repeated data, the repeated data needs to be repeatedly loaded and repeatedly transmitted, which not only occupies more bandwidth in a transmission process but also increases the response time during webpage loading, resulting in slow webpage browsing speed.

With respect to the problem in the prior art that the method of generating a webpage template depends relatively strongly on a target website, an effective solution has not yet been developed at present.

SUMMARY

One of the main objectives of the present invention is to provide a method of generating a webpage template and a server, to solve the problem in the prior art that the method of generating a webpage template depends relatively strongly on a target website.

In order to achieve the foregoing objective, according to one aspect of the present invention, a method of generating a webpage template is provided. The method of generating a webpage template according to an embodiment of the present invention includes: collecting webpage data of a webpage; generating a webpage template of the webpage according to the webpage data; and generating a template index according to the generated webpage template; through the template index, it is feasible to retrieve a webpage template corresponding to the webpage.

Further, after the generating a webpage template of the webpage according to the webpage data, the method of generating a webpage template further includes: releasing the webpage template and the template index for multiple template servers that provide webpage templates; storing, by the multiple template servers, the webpage template and the template index respectively; and retrieving, by a first template server in the multiple template servers, a webpage template matching with the webpage by using the template index, and providing the template matching with the webpage for other template servers in the multiple template servers except the first template server.

Further, the releasing the webpage template and the template index for multiple template servers that provide webpage templates includes: after multiple webpage templates and the template index are generated; calculating an overall difference rate of a set of the multiple webpage templates and a set of historical templates; judging whether the overall difference rate is greater than a preset overall difference rate threshold; if it is judged that the overall difference rate is greater than the preset overall difference rate threshold, releasing the webpage template and the template index; and if it is judged that the overall difference rate is not greater than the preset overall difference rate threshold, not releasing the webpage template and the template index.

Further, the generating a template index according to the generated webpage template includes: selecting a template of which the quality satisfies a predetermined quality condition; determining URL paths applicable to templates; selecting, from the URL paths, a URL path applicable to the template of which the quality satisfies the predetermined quality condition; and converting the selected path to a template index.

Further, after the generating a webpage template of the webpage according to the webpage data, the method of generating a webpage template further includes: judging whether the number of the webpage template reaches a preset number; if it is judged that the number of the webpage template reaches the preset number, calculating a coverage rate of each webpage template; comparing a webpage template of which the coverage rate is less than a first preset coverage rate threshold with a webpage template of which the coverage rate is greater than the first preset coverage rate threshold; and if a difference rate between the webpage template of which the coverage rate is less than the first preset coverage rate threshold and the webpage template of which the coverage rate is greater than the first preset coverage rate threshold is less than a preset difference rate threshold, merging the webpage template of which the coverage rate is less than the first preset coverage rate threshold with the webpage template of which the coverage rate is greater than the first preset coverage rate threshold.

Further, the comparing a webpage template of which the coverage rate is less than a first preset coverage rate threshold with a webpage template of which the coverage rate is greater than the first preset coverage rate threshold includes: sorting the multiple webpage templates according to the sizes of the coverage rates in a descending order; and comparing a webpage template sorted with a webpage template sorted in front of it.

Further, the generating a template index according to the generated webpage template includes: storing multiple webpage templates; calculating a coverage rate of each of the webpage templates; judging whether the sum of the coverage rates of the webpage templates under each path reaches a second preset coverage rate threshold; and deleting webpage templates under a path where the sum of the coverage rates of the webpage templates does not reach the second preset coverage rate threshold.

In order to achieve the foregoing objectives, according to another aspect of the present invention, a webpage template server is provided. The webpage template server according to the present invention includes: a collection unit configured to collect webpage data of a webpage; a generation unit configured to generate a webpage template of the webpage according to the webpage data; and an index unit configured to generate a template index according to the generated webpage template.

Furthermore, the webpage template server further includes: a release unit configured to, after the webpage template of the webpage is generated according to the webpage data, release the webpage template and the template index for multiple template servers that provide webpage templates; a storage unit configured to store the webpage template and the template index respectively in the multiple template servers; and a template retrieval unit configured to retrieve a webpage template matching with the webpage by using the template index, and provide the template matching with the webpage for other servers.

Moreover, the release unit includes: a calculation module configured to calculate an overall difference rate of a set of the multiple webpage templates and a set of historical templates; a judgment module configured to judge whether the overall difference rate is greater than a preset overall difference rate threshold; and a release module configured to, if it is judged that the overall difference rate is greater than the preset overall difference rate threshold, release the webpage template, and if it is judged that the overall difference rate is not greater than the preset overall difference rate threshold, not release the webpage template.

Further, the index unit includes: a template selection module configured to select a template of which the quality satisfies a predetermined quality condition; a template path derivation module configured to determine URL paths applicable to templates; a template path pruning module configured to select, from the URL paths, a URL path applicable to the template of which the quality satisfies the predetermined quality condition; and a template index generation module configured to convert the selected path to a template index.

Further, the webpage template server further includes: a judgment unit configured to, after the webpage template of the webpage is generated according to the webpage data, judge whether the number of the webpage template reaches a preset number; a calculation unit configured to, if it is judged that the number of the webpage template reaches the preset number, calculate a coverage rate of each webpage template; a comparison unit configured to compare a webpage template of which the coverage rate is less than a first preset coverage rate threshold with a webpage template of which the coverage rate is greater than the first preset coverage rate threshold; and a merging unit configured to, if a difference rate between the webpage template of which the coverage rate is less than the first preset coverage rate threshold and the webpage template of which the coverage rate is greater than the first preset coverage rate threshold is less than a preset difference rate threshold, merge the webpage template of which the coverage rate is less than the first preset coverage rate threshold with the webpage template of which the coverage rate is greater than the first preset coverage rate threshold.

Further, the comparison unit includes: a sorting module configured to sort the multiple webpage templates according to the sizes of the coverage rates in a descending order; and a comparison module configured to compare a webpage template sorted in the back with a webpage template sorted in the front.

Further, the index unit includes: a storage module configured to, after the webpage template of the webpage is generated according to the webpage data, store multiple webpage templates; a calculation module configured to calculate a coverage rate of each of the webpage templates; a third judgment module configured to judge whether the sum of the coverage rates of the webpage templates under each path reaches a second preset coverage rate threshold; and a deletion module configured to delete webpage templates under a path where the sum of the coverage rates of the webpage templates does not reach the second preset coverage rate threshold.

According to the embodiments of the present invention, webpage data of a webpage is collected, and a webpage template of the webpage is generated according to the webpage data, which solves the problem in the prior art that the method of generating a webpage template depends relatively strongly on a target web site, thereby achieving an effect of reducing the dependence of the method of generating a webpage template on the target website.

In order to achieve the foregoing objective, according to another aspect of the present invention, a webpage template server is provided, the webpage template server including:

a webpage template data storage unit configured to store webpage template data;

a webpage template data acquisition unit configured to acquire, from the webpage template data storage unit, webpage template data corresponding to webpage data acquired and forwarded by a middleware server upon receipt of a webpage browsing request from a terminal device;

a differential data generation unit configured to generate differential data between the webpage data and the webpage template data based on the webpage data received from the middleware server and the webpage template data corresponding to the webpage data, and a sending unit configured to forward the generated differential data to the terminal device via the middleware server, for the terminal device to display a requested webpage according to the differential data and webpage template data corresponding to the differential data locally stored by the terminal device.

The webpage browsing request includes a first webpage template ID list, the webpage template data acquisition unit is configured to sequentially acquire webpage template IDs in the first webpage template ID list, and acquire the webpage template data from the webpage template data storage unit based on the acquired webpage template IDs, and the differential data generation unit includes:

a difference data calculation module configured to calculate difference data between the webpage data and the webpage template data acquired from the webpage template data storage unit; and a determination module configured to, when a compression ratio between the calculated difference data and the webpage data is less than a first predetermined threshold, determine the difference data as the differential data, and when the compression ratio between the calculated difference data and the webpage data is not less than the first predetermined threshold, the webpage template data acquisition unit and the differential data generation unit are configured to repeatedly perform the process until the differential data is generated.

When the webpage browsing request includes a webpage address and a first webpage template ID list, the webpage template server includes:

a webpage template ID list library for storing a second webpage template ID list associatively with the webpage address;

a webpage template ID list acquisition module configured to acquire the corresponding second webpage template ID list from the webpage template ID list library according to a webpage address of a webpage requested to be browsed, a webpage template ID list merging unit configured to merge the first webpage template ID list and the second webpage template ID list into a third webpage template ID list;

the webpage template data acquisition unit is configured to sequentially acquire webpage template IDs in the third webpage template ID list, and acquire webpage template data from the webpage template data storage unit based on the acquired webpage template IDs, and the differential data generation unit includes: a difference data calculation module configured to calculate difference data between the webpage data and the webpage template data acquired from the webpage template data storage unit; and a determination module configured to, when a compression ratio between the calculated difference data and the webpage data is less than a first predetermined threshold, determine the difference data as the differential data, and when the compression ratio between the calculated difference data and the webpage data is not less than the first predetermined threshold, the webpage template data acquisition unit and the differential data generation unit are configured to repeatedly perform the process until the differential data is generated.

The webpage template ID list merging unit is configured to merge webpage template IDs in the first webpage template ID list and the second webpage template ID list according to priorities, to form a third webpage template ID list, wherein an intersection between the first webpage template ID list and the second webpage template ID list has the highest priority, the remaining part in the first webpage template ID list takes a second place, and the remaining part in the second webpage template ID list is the lowest.

Preferably, the webpage template server of the present invention further includes: a differential data saving unit configured to store the differential data associatively with the webpage template IDs and the webpage address; and a differential data query unit configured to query for associated differential data in the differential data saving unit according to the webpage template IDs and the webpage address, and when the differential data query unit fails to query the associated differential data, the differential data generation unit is configured to generate the differential data.

Preferably, the differential data generation unit of the present invention further includes:

a counting unit configured to, when the compression ratio between the calculated difference data and the webpage data is not less than the first predetermined threshold, count the number of times of calculation of the difference data calculation unit, and when the number of times of calculation does not exceed a second predetermined threshold, the webpage template data acquisition unit is configured to acquire a next webpage template ID, and acquire the webpage template data from the webpage template data storage unit based on the next webpage template ID, and preferably, the webpage template server of the present invention further includes: a differential data generation failure message generation unit configured to, when the number of times of calculation exceeds the second predetermined threshold, generate a differential data generation failure message, and the sending unit is further configured to return the differential data generation failure message to the middleware server, in order that the middleware server returns webpage data to the terminal device for display upon receipt of the differential data generation failure message.

Preferably, the webpage template server of the present invention further includes: a second judgment unit configured to, after the differential data is generated, judge whether a webpage template ID currently used by the webpage template data acquisition unit belongs to the first webpage template ID list, and when the webpage template ID currently used belongs to the first webpage template ID list, the sending unit is configured to return the generated differential data and the webpage template ID currently used to the middleware server which are then forwarded to the terminal device via the middleware server, and when the webpage template ID currently used does not belong to the first webpage template ID list, the sending unit is configured to return the webpage template ID currently used to the middleware server, and the middleware server sends the webpage template ID and the webpage data received to the terminal device.

In order to achieve the foregoing objective, according to another aspect of the present invention, a method of generating a webpage template is provided. The method of generating a webpage template may be a method of implementing webpage display by using a webpage template executed by a webpage template server, the method including:

after webpage data acquired and forwarded by a middleware server in response to a received webpage browsing request from a terminal device is acquired, acquiring, from a webpage template data storage unit in a webpage template server, webpage template data corresponding to the webpage data;

generating differential data between the webpage data and the webpage template data based on the webpage data and the webpage template data; and forwarding the generated differential data to the terminal device via the middleware server, for the terminal device to display a requested webpage according to the differential data and webpage template data corresponding to the differential data locally stored by the terminal device.

The webpage browsing request includes a first webpage template ID list, and webpage template data corresponding to the webpage data acquired from a webpage template data storage unit, and the generating differential data between the webpage data and the webpage template data based on the webpage data and the webpage template data includes:

sequentially acquiring first webpage template IDs in the first webpage template ID list to repeatedly perform the following process, until the differential data is generated:

acquiring webpage template data from the webpage template data storage unit based on the first webpage template IDs currently acquired, and calculating difference data between the webpage data and the webpage template data acquired from the webpage template data storage unit, when a compression ratio between the calculated difference data and the webpage data is less than a first predetermined threshold, determining the difference data as the differential data, and when the compression ratio between the calculated difference data and the webpage data is not less than the first predetermined threshold, acquiring a next first webpage template ID from the first webpage template ID list as a new first webpage template ID currently acquired.

The webpage browsing request includes a webpage address of the requested webpage and a first webpage template ID list, and a second webpage template ID list is stored associatively with the webpage address in a webpage template ID list library of the webpage template server, webpage template data corresponding to the webpage data acquired from a webpage template data storage unit, and the generating differential data between the webpage data and the webpage template data based on the webpage data and the webpage template data includes:

acquiring the corresponding second webpage template ID list from the webpage template ID list library according to a webpage address of a webpage requested to be browsed, merging the first webpage template ID list and the second webpage template ID list into a third webpage template ID list;

sequentially acquiring webpage template IDs in the third webpage template ID list to repeatedly perform the following process, until the differential data is generated:

acquiring webpage template data from the webpage template data storage unit based on the webpage template IDs currently acquired, and calculating difference data between the webpage data and the webpage template data acquired from the webpage template data storage unit, when a compression ratio between the calculated difference data and the webpage data is less than a first predetermined threshold, determining the difference data as the differential data, and when the compression ratio between the calculated difference data and the webpage data is not less than the first predetermined threshold, acquiring a next webpage template ID from the third webpage template ID list as a new webpage template ID currently acquired.

The merging the first webpage template ID list and the second webpage template ID list into a third webpage template ID list includes:

merging webpage template IDs in the first webpage template ID list and the second webpage template ID list according to priorities, to form a third webpage template ID list, wherein an intersection between the first webpage template ID list and the second webpage template ID list has the highest priority, the remaining part in the first webpage template ID list takes second place, and the remaining part in the second webpage template ID list is the lowest.

The method further includes: after the differential data is generated, judging, by the webpage template server, whether a webpage template ID currently used belongs to the first webpage template ID list, and when the webpage template ID currently used belongs to the first webpage template ID list, returning, by the webpage template server, the generated differential data and the webpage template ID currently used to the middleware server which are then forwarded to the terminal device via the middleware server, when the webpage template ID currently used does not belong to the first webpage template ID list, returning, by the webpage template server, the webpage template ID currently used to the middleware server, and sending, by the middleware server, the webpage template ID and the webpage data received to the terminal device.

In order to achieve the foregoing objective, according to another aspect of the present invention, a computer readable medium having a processor executable program code is provided, characterized in that, when being executed, the program code causes a processor to perform the following steps of: collecting webpage data of a webpage; generating a webpage template of the webpage according to the webpage data; and generating a template index according to the generated webpage template.

In order to achieve the foregoing objective, according to another aspect of the present invention, a computer program is provided, the computer program being configured to perform any one of the methods of generating a webpage template according to the present invention.

According to the method of implementing webpage display by using a webpage template and a webpage template server in the present invention, differential data between a webpage template and webpage data is stored and calculated by setting a webpage template server, a middleware server sends the differential data to a terminal device, and the terminal device locally calls a webpage template corresponding to the differential data, thus implementing webpage display. During transmission of webpage data, only the differential data is transmitted, and the differential data is less compared with the webpage data. Network resources can be effectively saved, occupation of bandwidth is reduced, and the loading speed of the webpage is increased, thereby further increasing the speed at which a user browses the webpage.

BRIEF DESCRIPTION OF THE DRAWINGS

The drawings constituting a part of the present application are used to provide a further understanding about the present invention, and illustrative embodiments of the present invention and description thereof are used to explain the present invention, but do not constitute improper limitations to the present invention. In the drawings.

DETAILED DESCRIPTION

It should be noted that, without a conflict, embodiments in the present application and features in the embodiments can be combined with each other. The present invention is described in detail below with reference to the accompanying drawings and in combination with the embodiments.

In order to make persons skilled in the art better understand the solutions of the present invention, the technical solutions of the present invention will be clearly and thoroughly described below with reference to the accompanying drawings in the embodiments of the present invention. It is obvious that the embodiments to be described are only some rather than all of the embodiments of the present invention. All other embodiments derived by persons of ordinary skill in the art based on the embodiments of the present invention without carrying out creative activities should fall within the protection scope of the present invention.

It should be noted that the terms "first", "second" and so on in the specification, claims and the drawings of the present invention are used to distinguish similar objects, but not necessarily to describe a particular order or sequence. It should be understood that such terms can be interchangable under appropriate circumstances, and the embodiments of the present invention described herein could be implemented in an order other than those illustrated or described herein. In addition, the terms "comprise/include" and "have" as well as their any variations are intended to cover non-exclusive inclusion, for example, a process, method, system, product or device including a series of steps or units need not be limited to the steps or units clearly listed, but may include other steps or units not clearly listed or inherent to the process, method, system, product or device.

An embodiment of the present invention provides a method of generating a webpage template.

Figure 1:
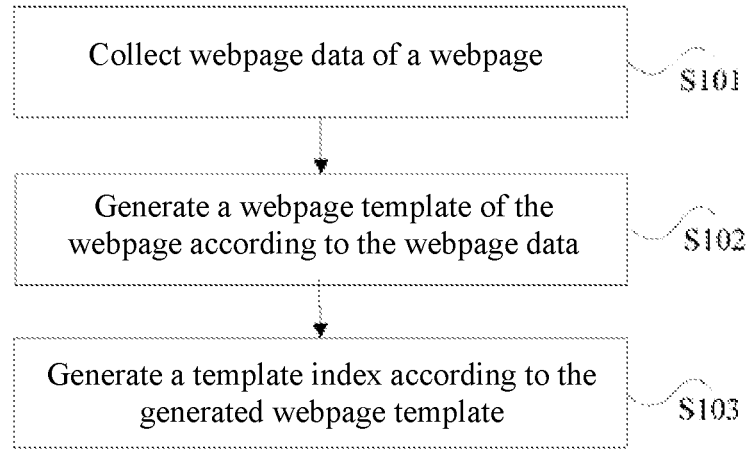
FIG. 1 is a flow chart of a first embodiment of a method of generating a webpage template according to the present invention.

FIG. 1 is a flow chart of a method of generating a webpage template according to a first method embodiment of the present invention. As shown in FIG. 1, the method of generating a webpage template includes the following steps:

Step S101. Webpage data of a webpage is collected. The webpage data of the webpage collected is webpage data of a webpage to be browsed, the webpage data of the webpage is from one or more clients, the webpage data of the webpage collected may be webpage data of one or more webpages from one client, and the webpage data of the webpage collected may also be data of webpages under the same domain name or different domain names. The collected webpage data is stored.

It should be noted that the webpage data of the webpage collected may be collected according to a user's requirement for browsing the webpage, and the sources of the webpage data of the webpage are merely for illustrating that data of webpages of the sources can be collected, but are not used to limit that webpage data of all webpages of all the above webpage sources must be collected in the process of collecting the webpage data of the webpage.

Step S102. A webpage template of the webpage is generated according to the webpage data collected.

The webpage template may be calculated and generated by using a locality sensitive hashing (simhash) algorithm. Specifically, it is feasible to use the simhash algorithm to generate an N-bit hash value for the webpage data. T label values are generated for the generated N-bit hash value through a random hashing and prefixing method. A webpage template is searched from webpage templates under different domain names for each label value. If a suitable webpage template is found, it is feasible to use the found webpage template as a webpage template of a webpage to be browsed to transmit incremental data, and if no suitable webpage template is found, it is feasible to use the webpage template of the webpage to be browsed as a webpage template to be stored in a template library.

Step S103. A template index is generated according to the generated webpage templates. Through the template index, it is feasible to search for a webpage template corresponding to the webpage; in order to make it convenient to call the template, a template index is generated according to the generated webpage templates, and a matched webpage template is searched by using the template index.

As the webpage template generated with the above method may result in that identical or similar webpage templates appear, the identical or similar webpage templates may be stored in different clients, and in order to make the obtained webpage templates reduce occupation of storage space and cause the obtained webpage templates to be more representative, it is feasible to reserve one of the identical or similar webpage templates and delete the other identical or similar webpage templates.

In this embodiment, when a webpage template is established, it is feasible to use collected webpage data to establish the webpage template of the webpage; in this way, establishment of the template does not depend on a particular target website, the dependence on the target website is reduced, and a corresponding webpage template can be established for any target website.

Figure 2:
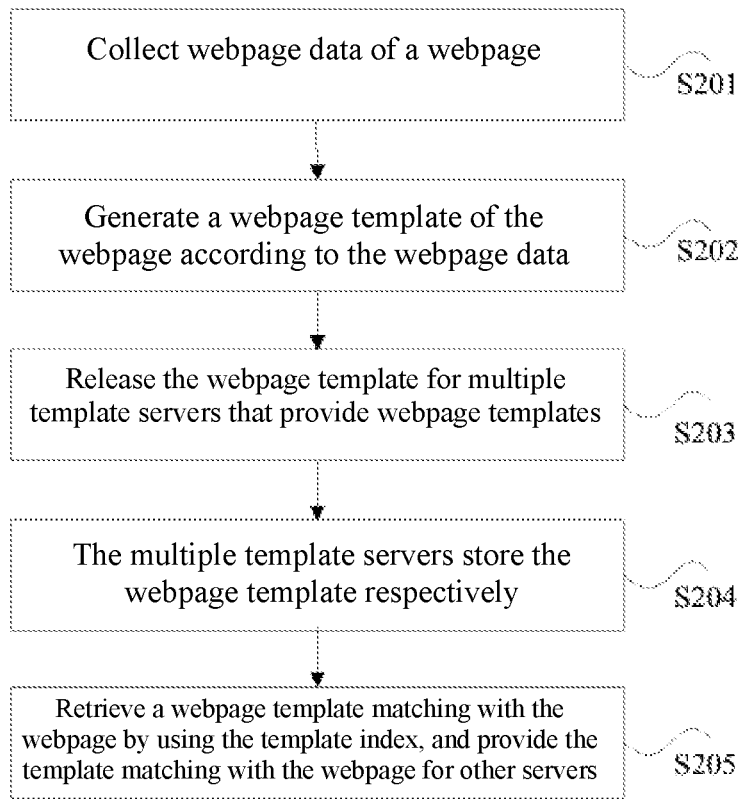
FIG. 2 is a flow chart of a second embodiment of a method of generating a webpage template according to the present invention.

FIG. 2 is a flow chart of a method of generating a webpage template according to a second method embodiment of the present invention. As shown in FIG. 2, the method of generating a webpage template includes the following steps:

Step S201. Webpage data of a webpage is collected. The webpage data of the webpage collected is webpage data of a webpage to be browsed, the webpage data of the webpage is from one or more clients, the webpage data of the webpage collected may be webpage data of one or more webpages from one client, and the webpage data of the webpage collected may also be data of webpages under the same domain name or different domain names. The collected webpage data is stored.

It should be noted that the webpage data of the webpage collected may be collected according to a user's requirement for browsing the webpage, and the sources of the webpage data of the webpage are merely for illustrating that data of webpages of the sources can be collected, but are not used to limit that webpage data of all webpages of all the above webpage sources must be collected in the process of collecting the webpage data of the webpage.

Step S202. A webpage template of the webpage is generated according to the webpage data collected.

As more than one template is generated through the above step, in order to obtain a webpage template matching with a webpage browsed by a user, the generated webpage templates may be filtered. In order to facilitate filtering, the following step S203 to step S205 are performed at first.

Step S203. The webpage template and the template index are released for multiple template servers that provide webpage templates. After the webpage template is generated according to the webpage data, it is feasible to release the webpage template for multiple template servers that provide webpage templates. The multiple template servers may provide webpage templates for different websites.

Step S204. The multiple template servers store the webpage template and the template index respectively. The multiple template servers store the webpage template received respectively, in this way, each template server in the multiple template servers has a webpage template, and when it is necessary to transmit webpage data on the basis of the webpage template, it is feasible to select a webpage template in a template server in the multiple template servers in a better network condition to transmit incremental data, thus increasing convenience and reliability of calling the webpage template.

Step S205. A first template server in the multiple template servers retrieves a webpage template matching with the webpage by using the template index, and the template matching with the webpage is provided for other template servers in the multiple template servers except the first template server; the first template server may be any template server in the multiple template servers. Whether a webpage request matches with a webpage template stored in a server is determined rapidly by using the template index, and the matched webpage template is determined according to a website of a requested webpage. After the webpage template matching with the webpage is determined, the matched webpage template is sent to other template servers.

Considering that the amount of data to be processed in the above process is significant, it is feasible to use a distributed computing framework such as Hadoop to construct a program and use large data volume such as HBase storage services. In addition, in order to increase reliability, the method of generating a webpage template according to the embodiment of the present invention, for example, collecting webpage data, generating a webpage template, releasing the webpage template, retrieving the webpage template and so on, can be deployed on multiple servers, to cause the multiple servers to serve collaboratively, that is, the function of the webpage template server of the present invention can be completed by multiple common servers.

Figure 3:
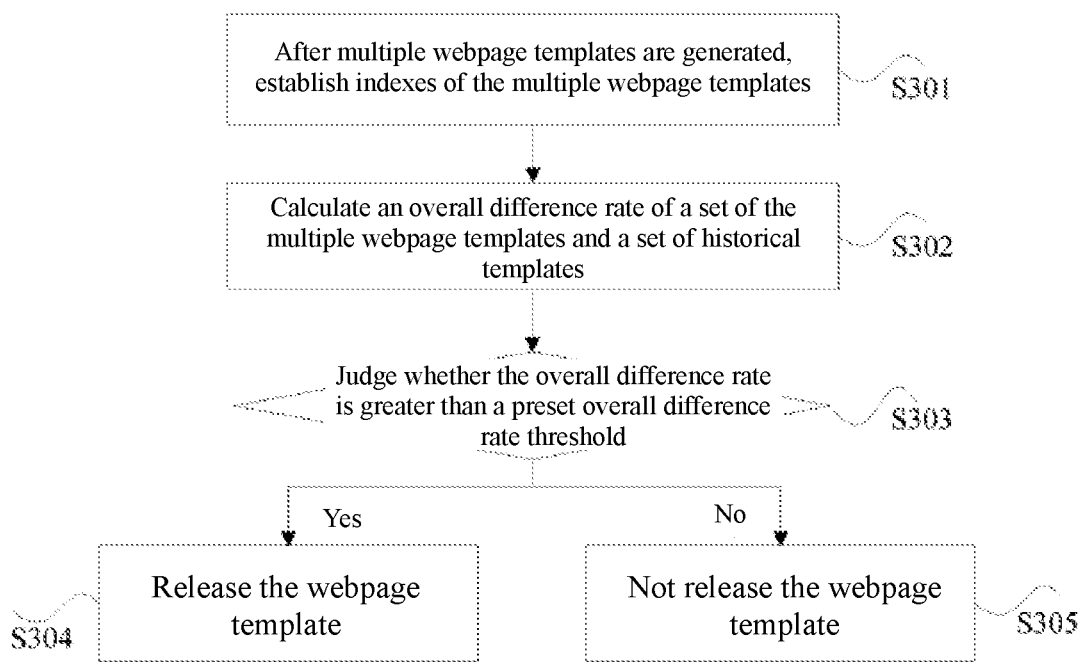
FIG. 3 is a flow chart of a third embodiment of a method of generating a webpage template according to the present invention.

FIG. 3 is a flow chart of a method of generating a webpage template according to a third method embodiment of the present invention. The embodiment shown in FIG. 3 can serve as one of preferred implementation modes of step S203 in the embodiment shown in FIG. 2 of releasing the webpage template and the template index for multiple template servers that provide webpage templates, and after step S202 shown in FIG. 2 is performed, the following steps are performed:

Step S301. After multiple webpage templates are generated, indexes of the multiple webpage templates are established. After multiple webpage templates are generated, in order to make it convenient to search for a webpage template, indexes of the multiple webpage templates are established. The indexes of the webpage templates can index a webpage template through a website or a domain name. Specifically, in order to improve accuracy of indexing the webpage template, it is feasible to obtain an index of the webpage template by generating a row label value or an MD5 value of a domain name.

Step S302. An overall difference rate of a set of the multiple webpage templates and a set of historical templates is calculated. In order to avoid a waste of resources caused by changing the webpage template to re-generate an incremental file when the webpage template changes slightly, an overall difference rate of a set of the multiple webpage templates and a set of historical templates is calculated.

Step S303. Whether the overall difference rate is greater than a preset overall difference rate threshold is judged. Whether the overall difference rate of the set of the multiple webpage templates and the set of historical templates is greater than a preset overall difference rate threshold is judged, if the overall difference rate of the set of the multiple webpage templates and the set of historical templates is greater than the preset overall difference rate threshold, the webpage template changes greatly and the webpage template is directly released, and if the overall difference rate of the set of the multiple webpage templates and the set of historical templates is less than the preset overall difference rate threshold, the webpage template changes slightly and the webpage template is not released.

Step S304. If it is judged that the overall difference rate is greater than the preset overall difference rate threshold, the webpage template is released. If the overall difference rate of the set of the multiple webpage templates and the set of historical templates is greater than the preset overall difference rate threshold, it indicates that the set of the multiple webpage templates generated changes more than the set of historical templates, and it is feasible to release the webpage template.

Step S305. If it is judged that the overall difference rate is not greater than the preset overall difference rate threshold, the webpage template is not released. If the overall difference rate of the set of the multiple webpage templates and the set of historical templates is less than the preset overall difference rate threshold, it indicates that the set of the multiple webpage templates generated changes less than the set of historical templates, it is feasible to transmit an incremental file based on a historical template, and it is feasible not to release the webpage template.

In order to facilitate a webpage template matching with the webpage in the generated webpage template, a template index is generated according to the generated webpage template, and a method of generating the template index is as follows:

At first, a template of which the quality satisfies a predetermined quality condition is selected. A template in line with a predetermined quality condition is searched in the generated webpage template, wherein the predetermined quality condition may be that a coverage rate of the template for the webpage accessed by the user is greater than a predetermined threshold and the template of which the quality satisfies the predetermined quality condition can save the transmission amount of differential data compared with a template of which the quality is not in line with the predetermined quality condition.

Next, URL paths applicable to templates are determined. All webpage templates under the path are searched according to URL paths used by the templates, so that the speed at which the webpage template is searched can be increased.

Then a URL path applicable to the template of which the quality satisfies the predetermined quality condition is selected from the URL paths. As a template of a short path has a better degree of coverage, searching of a URL path can start from a short path nearest a root directory.

Finally, the selected path is converted to a template index. The path of the webpage template selected according to the URL path corresponds to the webpage accessed by the user, to form a template index.

Figure 4:
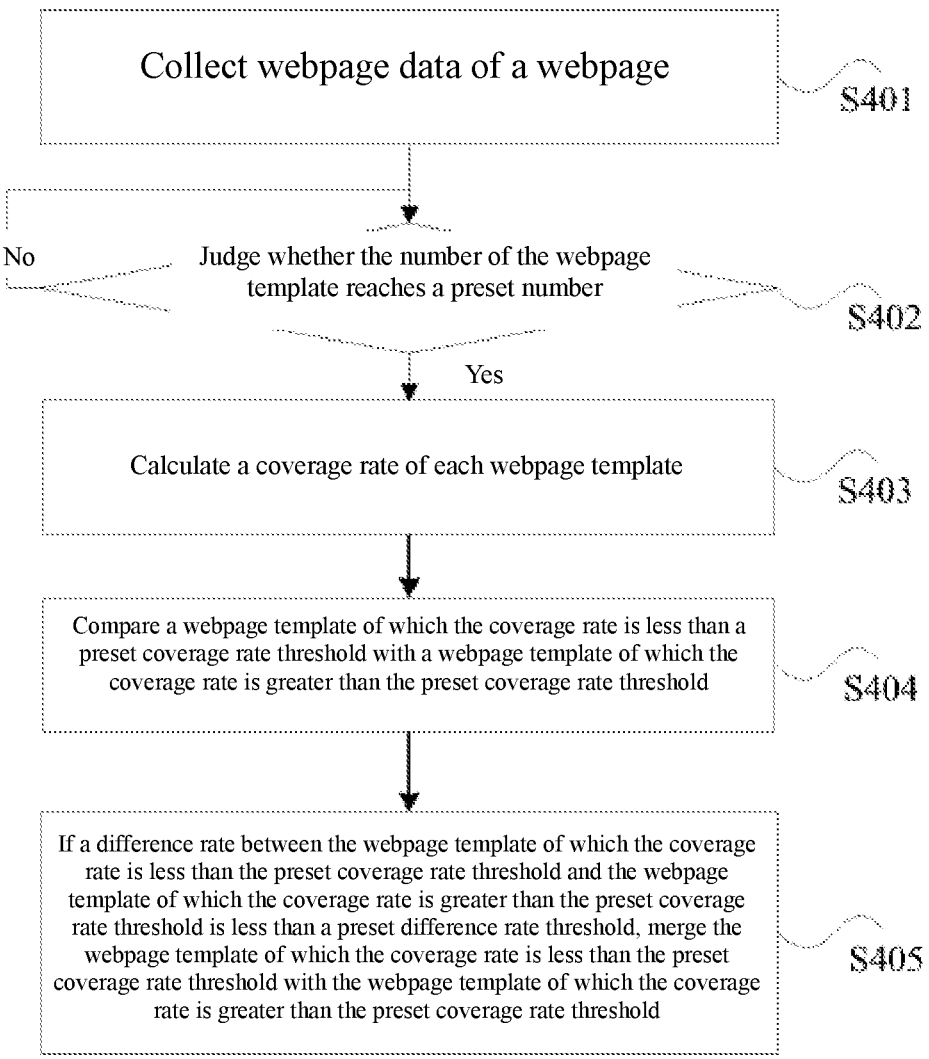
FIG. 4 is a flow chart of a fourth embodiment of a method of generating a webpage template according to the present invention.

FIG. 4 is a flow chart of a method of generating a webpage template according to a fourth method embodiment of the present invention. As shown in FIG. 4, the embodiment shown in FIG. 4 can serve as one of preferred implementation modes of the embodiment shown in FIG. 1, and specific steps are as follows:

Step S401. Webpage data of a webpage is collected. The webpage data of the webpage collected is webpage data of a webpage to be browsed, the webpage data of the webpage is from one or more clients, the webpage data of the webpage collected may be webpage data of one or more webpages from one client, and the webpage data of the webpage collected may also be data of webpages under the same domain name or different domain names.

Step S402. Whether the number of the webpage template reaches a preset number is judged. After the webpage template of the webpage is generated according to the webpage data, it is necessary to judge whether the number of the webpage template reaches a preset number. If it is judged that the number of the webpage template does not reach the preset number, it is feasible to continuously generate a webpage template of the webpage according to the webpage data, and if it is judged that the number of the webpage template reaches the preset number, it is feasible to calculate a coverage rate of each webpage template.

Step S403. If it is judged that the number of the webpage template reaches the preset number, a coverage rate of each webpage template is calculated. A template coverage rate is an important index of measuring the quality of a generated webpage template, the template coverage rate may be, in one website, a ratio of the number of webpages in the website to which the webpage template is applicable to the number of all webpages of the website, and the greater the template coverage rate is, the more the number of the webpages in the website to which the webpage template is applicable is. The template coverage rate not only can measure the quality of website templates of one website, but also can measure the quality of webpage templates under a certain path. For example, a certain webpage template does not have a very high website coverage rate but has a very high coverage rate under a certain path, and the webpage template can also achieve a good effect in an actual application.

Step S404. A webpage template of which the coverage rate is less than a first preset coverage rate threshold is compared with a webpage template of which the coverage rate is greater than the first preset coverage rate threshold. After the coverage rate of each webpage template is calculated, in order to avoid re-selecting a similar webpage template to transmit an incremental file in the case that the webpage template changes slightly, it is feasible to compare a webpage template of which the coverage rate is less than a first preset coverage rate threshold with a webpage template of which the coverage rate is greater than the first preset coverage rate threshold.

Step S405. If a difference rate between the webpage template of which the coverage rate is less than the first preset coverage rate threshold and the webpage template of which the coverage rate is greater than the first preset coverage rate threshold is less than a preset difference rate threshold, the webpage template of which the coverage rate is less than the first preset coverage rate threshold is merged with the webpage template of which the coverage rate is greater than the first preset coverage rate threshold. The difference rate between the webpage template of which the coverage rate is less than the first preset coverage rate threshold and the webpage template of which the coverage rate is greater than the first preset coverage rate threshold may be a ratio of a difference between two webpage templates calculated with an open-vcdiff algorithm by two templates to the size of the webpage template of which the coverage rate is less than the first preset coverage rate threshold, and the difference rate between the webpage template of which the coverage rate is less than the first preset coverage rate threshold and the webpage template of which the coverage rate is greater than the first preset coverage rate threshold may be used to measure a degree of difference between the webpage template of which the coverage rate is less than the first preset coverage rate threshold and the webpage template of which the coverage rate is greater than the first preset coverage rate threshold.

If the difference rate between the webpage template of which the coverage rate is less than the first preset coverage rate threshold and the webpage template of which the coverage rate is greater than the first preset coverage rate threshold is less than a preset difference rate threshold, it is considered that the webpage template of which the coverage rate is less than the first preset coverage rate threshold is similar to the webpage template of which the coverage rate is greater than the first preset coverage rate threshold, the webpage template of which the coverage rate is less than the first preset coverage rate threshold is merged with the webpage template of which the coverage rate is greater than the first preset coverage rate threshold, and the merging process may be merging data of the webpage template of which the coverage rate is less than the first preset coverage rate threshold into data of the webpage template of which the coverage rate is greater than the first preset coverage rate threshold.

In order to conveniently compare the webpage template of which the coverage rate is less than the first preset coverage rate threshold with the webpage template of which the coverage rate is greater than the first preset coverage rate threshold, it is feasible to sort the multiple webpage templates according to the sizes of the coverage rates in a descending order and then compare a webpage template sorted in the back with a webpage template sorted in the front.

After the multiple webpage templates are sorted according to the sizes of the coverage rates in a descending order, by comparing the webpage templates in a queue in pairs or one by one, the webpage templates of which the webpage template difference rate is less than the preset difference rate threshold can be merged.

After the webpage templates of which the webpage template difference rate is less than the preset difference rate threshold are merged, indexes of the webpage templates are obtained according to a web site or a domain name of a webpage and data of the webpage templates and the indexes of the webpage templates are released.

In order to facilitate storage and calling, preferably, the generating template index according to the generated webpage template includes the following steps:

Multiple webpage templates are stored. In order to facilitate calling of templates, after the webpage templates of the webpage are generated, the generated multiple webpage templates are stored.

A coverage rate of each of the webpage templates is calculated. A template near a root directory generally has a better coverage rate, and the template near the root directory is preferentially processed during template searching; therefore, when multiple webpage templates are calculated, the generated webpage templates are sorted according to path depths at first, and an arrangement position of a webpage template in a short path is much closer to the root directory than a webpage template in a deep path.

As the multiple webpage templates have been sorted according to path depths, it is feasible to calculate the coverage rate of each webpage template under one path when the coverage rate of each webpage template is calculated. The coverage rate of each webpage template may be a coverage rate of the webpage template relative to all webpage templates under the whole path.

For ease of using a webpage template with a greater coverage rate to transmit an incremental file, it is feasible to perform sorting according to the coverage rates from high to low. At the same time, when there are many webpage templates under the same path, it is feasible to intercept a certain number of webpage templates according to path depths in an order from long to short, thus avoiding that many webpage templates are under the same path and the computing speed is reduced.

Whether the sum of the coverage rates of the webpage templates under each path reaches a second preset coverage rate threshold is judged.

After the coverage rate of each webpage template is calculated, whether the sum of the coverage rates of the webpage templates under each path reaches a second preset coverage rate threshold is judged, if the sum reaches the second preset coverage rate threshold, the path is reserved; if it is judged that the sum of the coverage rates of the webpage templates under each path does not reach the second preset coverage rate threshold, webpage templates under a path where the sum of the coverage rates of the webpage templates does not reach the second preset coverage rate threshold are deleted.

Webpage templates under a path where the sum of the coverage rates of the webpage templates does not reach the second preset coverage rate threshold are deleted. The sum of the coverage rates of the webpage templates does not reach the second preset coverage rate threshold, and all webpage templates under a path where the sum of the coverage rates of the webpage templates does not reach the second preset coverage rate threshold are not necessarily processed and used; therefore, it is feasible to delete webpage templates under a path where the sum of the coverage rates of the webpage templates does not reach the second preset coverage rate threshold, to save storage resources.

A template index can be generated according to the generated webpage template through the above steps. So, when a user accesses a webpage, the user can search for a matched webpage template by using the template index.

Figure 5:
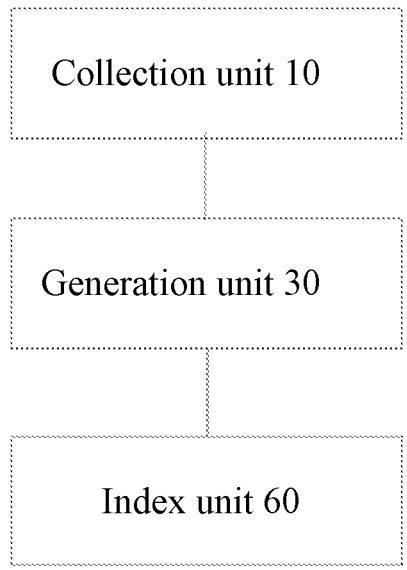
FIG. 5 is a schematic diagram of a first embodiment of a webpage template server according to the present invention.

FIG. 5 is a schematic diagram of a webpage template server according to the first apparatus embodiment of the present invention. The webpage template server and the webpage template server in the foregoing embodiments may be the same server. As shown in FIG. 5, the webpage template server includes a collection unit 10, a generation unit 30 and an index unit 60.

The collection unit 10 is configured to collect webpage data of a webpage. The webpage data of the webpage collected may be webpage data of a webpage to be browsed, the webpage data of the webpage may be from one or more clients, the webpage data of the webpage collected may be webpage data of one or more webpages from one client, and the webpage data of the webpage collected may also be data of webpages under the same domain name or different domain names. The collected webpage data is stored.

It should be noted that the webpage data of the webpage collected may be collected according to a user's requirement for browsing the webpage, and the sources of the webpage data of the webpage are merely for illustrating that data of webpages of the sources can be collected, but are not used to limit that webpage data of all webpages of all the above webpage sources must be collected in the process of collecting the webpage data of the webpage.

The generation unit 30 is configured to generate a webpage template of the webpage according to the webpage data collected, for example, it is feasible to generate the webpage template of the webpage according to the webpage data of the webpage.

The webpage template may be calculated and generated by using a locality sensitive hashing (simhash) algorithm. Specifically, it is feasible to use the simhash algorithm to generate an N-bit hash value for the webpage data, T label values are generated for the generated N-bit hash value through a random hashing and prefixing method, a webpage template is searched from webpage templates under different domain names for each label value, if a suitable webpage template is found, it is feasible to use the found webpage template as a webpage template of a webpage to be browsed to transmit incremental data, and if no suitable webpage template is found, it is feasible to use the webpage template of the webpage to be browsed as a webpage template to be stored in a template library.

The index unit 60 is configured to generate a template index according to the generated webpage template. The index unit can establish a mapping relationship between URL paths of webpage templates and templates according to the generated webpage template and take the mapping relationship as a template index.

As the webpage template generated with the above method may result in that identical or similar webpage templates appear, the identical or similar webpage templates may be stored in different clients, and in order to make the obtained webpage templates reduce occupation of storage space and cause the obtained webpage templates to be more representative, it is feasible to reserve one of the identical or similar webpage templates and delete the other identical or similar webpage templates.

In this embodiment, when a webpage template is established, it is feasible to use collected webpage data to establish the webpage template of the webpage; in this way, establishment of the template does not depend on a particular target website, the dependence on the target website is reduced, and a corresponding webpage template can be established for any target website.

Figure 6:
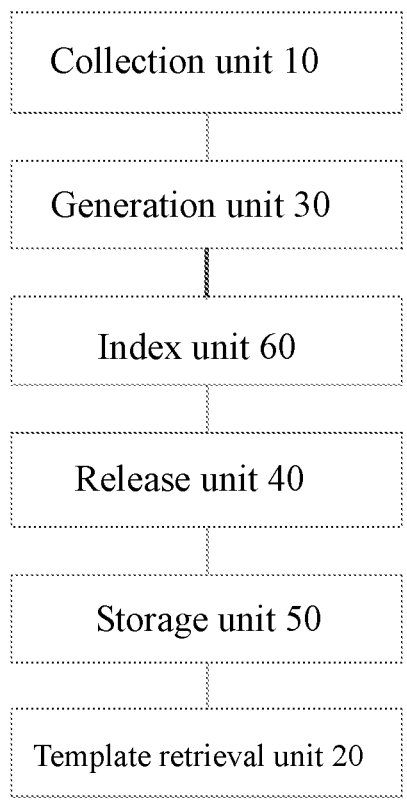
FIG. 6 is a schematic diagram of a second embodiment of a webpage template server according to the present invention.

FIG. 6 is a schematic diagram of a webpage template server according to a second apparatus embodiment of the present invention. The embodiment can serve as one of preferred implementation modes of the embodiment shown in FIG. 5. As shown in FIG. 6, the webpage template server includes a collection unit 10, a generation unit 30, a release unit 40, a storage unit 50, an index unit 60 and a template retrieval unit 20.

The release unit 40 is configured to, after the webpage template of the webpage is generated according to the webpage data, release the webpage template and the template index for multiple template servers that provide webpage templates. After the webpage template is generated according to the webpage data, it is feasible to release the webpage template for multiple template servers that provide webpage templates. The multiple template servers may send webpage templates to multiple websites, and may also collect webpage data from the multiple websites.

The storage unit 50 is configured to store the webpage template and the template index respectively in the multiple template servers. The multiple template servers store the webpage template received respectively. In this way, each template server in the multiple template servers has a webpage template, and when it is necessary to transmit webpage data on the basis of the webpage template, it is feasible to select a webpage template in a template server in the multiple template servers in a network condition to transmit incremental data, thus increasing convenience and reliability of calling the webpage template.

The index unit 60 is configured to generate a template index according to the generated webpage template. The index unit can establish a mapping relationship between URL paths of webpage templates and templates according to the generated webpage template and take the mapping relationship as a template index.

The template retrieval unit 20 is configured to retrieve a webpage template matching with the webpage by using the template index, and providing the template matching with the webpage for other servers. Whether a webpage request matches with a webpage template stored in a server is determined rapidly by using the template index, and the matched webpage template is determined according to a website of a requested webpage. After any template generation server in multiple template generation servers determines the webpage template matching with the webpage, the matched webpage template is sent to other servers in the multiple template generation servers.

Considering that the amount of data to be processed in the above process is great, it is feasible to use a distributed computing framework such as Hadoop to construct a program and use large data volume such as HBase storage services. In addition, in order to increase reliability, the method of generating a webpage template according to the embodiment of the present invention, for example, collecting webpage data, generating a webpage template, releasing the webpage template, retrieving the webpage template and so on, can be deployed on multiple servers, to cause the multiple servers to serve collaboratively, that is, the function of the webpage template server of the present invention can be completed by multiple common servers. Different functional modules may be deployed in different servers. It is also feasible to deploy the same functional module in different servers.

Preferably, in order to generate a template index, the index unit 60 includes a template selection module, a template path derivation module, a template path pruning module and a template index generation module.

The template selection module is configured to select a template of which the quality satisfies a predetermined quality condition. A template in line with a predetermined quality condition is searched in the generated webpage template, wherein the predetermined quality condition may be that a coverage rate of the template for the webpage accessed by the user is greater than a predetermined threshold and the template of which the quality satisfies the predetermined quality condition can save the transmission amount of differential data compared with a template of which the quality is not in line with the predetermined quality condition.

The template path derivation module is configured to determine URL paths applicable to templates. All webpage templates under the path are searched according to URL paths used by the templates, so that the speed at which the webpage template is searched can be increased.

The template path pruning module is configured to select, from the URL paths, a URL path applicable to the template of which the quality satisfies the predetermined quality condition. As a template of a short path has a better degree of coverage, searching of a URL path can start from a short path nearest a root directory.

The template index generation module is configured to convert the selected path to a template index. The path of the webpage template selected according to the URL path corresponds to the webpage accessed by the user, to form a template index.

Figure 7:
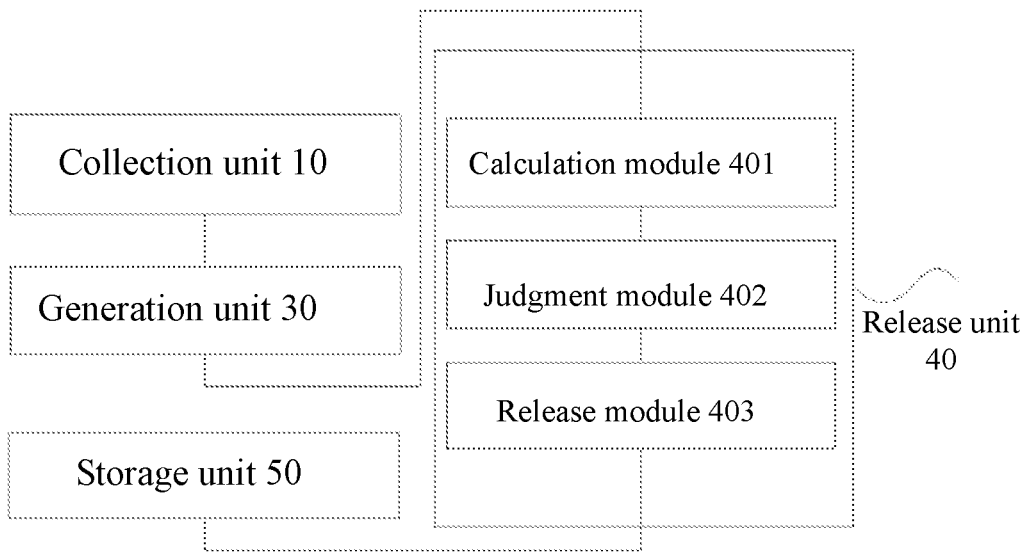
FIG. 7 is a schematic diagram of a third embodiment of a webpage template server according to the present invention.

FIG. 7 is a schematic diagram of a webpage template server according to a third apparatus embodiment of the present invention. The embodiment can serve as one of preferred implementation modes of the embodiment shown in FIG. 5; as shown in FIG. 7, the webpage template server includes a collection unit 10, a generation unit 30, a release unit 40, a storage unit 50 and an index unit 60, wherein the release unit 40 includes a calculation module 401, a judgment module 402 and a release module 403.

The calculation module 401 is configured to calculate an overall difference rate of a set of the multiple webpage templates and a set of historical templates. In order to avoid a waste of resources caused by changing the webpage template to re-generate an incremental file when the webpage template changes slightly, an overall difference rate of a set of the multiple webpage templates and a set of historical templates is calculated.

The judgment module 402 is configured to judge whether the overall difference rate is greater than a preset overall difference rate threshold. Whether the overall difference rate of the set of the multiple webpage templates and the set of historical templates is greater than a preset overall difference rate threshold is judged. If the overall difference rate of the set of the multiple webpage templates and the set of historical templates is greater than the preset overall difference rate threshold, the webpage template changes greatly and the webpage template is directly released, and if the overall difference rate of the set of the multiple webpage templates and the set of historical templates is less than the preset overall difference rate threshold, the webpage template changes slightly and the webpage template is not released.

The release module 403 is configured to, if it is judged that the overall difference rate is greater than the preset overall difference rate threshold, release the webpage template, and if it is judged that the overall difference rate is not greater than the preset overall difference rate threshold, not release the webpage template. If the overall difference rate of the set of the multiple webpage templates and the set of historical templates is greater than the preset overall difference rate threshold, it indicates that the set of the multiple webpage templates generated changes more than the set of historical templates, and it is feasible to release the webpage template. If the overall difference rate of the set of the multiple webpage templates and the set of historical templates is less than the preset overall difference rate threshold, it indicates that the set of the multiple webpage templates generated changes less than the set of historical templates, it is feasible to transmit an incremental file based on a historical template, and it is feasible not to release the webpage template.

Figure 8:
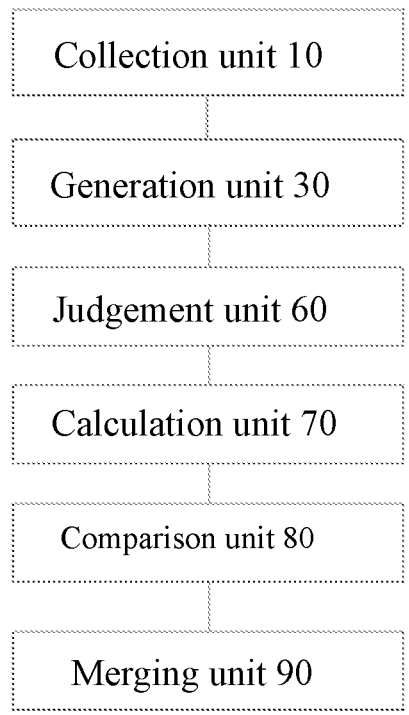
FIG. 8 is a schematic diagram of a fourth embodiment of a webpage template server according to the present invention.

FIG. 8 is a schematic diagram of a webpage template server according to a fourth apparatus embodiment of the present invention. As shown in FIG. 8, the webpage template server includes a collection unit 10, a generation unit 30, a judgment unit 60, a calculation unit 70, a comparison unit 80 and a merging unit 90. The functions of the collection unit 10 and the generation unit 30 shown in FIG. 8 are the same as the functions of the collection unit 10 and the generation unit 30 in the embodiment shown in FIG. 5, which are not repeated herein.

The judgment unit 60 is configured to, after the webpage template of the webpage is generated according to the webpage data, judge whether the number of the webpage template reaches a preset number. After the webpage template of the webpage is generated according to the webpage data, it is necessary to judge whether the number of the webpage template reaches a preset number. If it is judged that the number of the webpage template does not reach the preset number, it is feasible to continuously generate a webpage template of the webpage according to the webpage data, and if it is judged that the number of the webpage template reaches the preset number, it is feasible to calculate a coverage rate of each webpage template.

The calculation unit 70 is configured to, if it is judged that the number of the webpage template reaches the preset number, calculate a coverage rate of each webpage template. A template coverage rate is an important index of measuring the quality of a generated webpage template, the template coverage rate may be, in one website, a ratio of the number of webpages in the website to which the webpage template is applicable to the number of all webpages of the website, and the greater the template coverage rate is, the more the number of the webpages in the website to which the webpage template is applicable is. The template coverage rate not only can measure the quality of website templates of one website, but also can measure the quality of webpage templates under a certain path. For example, a certain webpage template does not have a very high website coverage rate but has a very high coverage rate under a certain path, and the webpage template can also achieve a good effect in an actual application.

The comparison unit 80 is configured to compare a webpage template of which the coverage rate is less than a first preset coverage rate threshold with a webpage template of which the coverage rate is greater than the first preset coverage rate threshold. After the coverage rate of each webpage template is calculated, in order to avoid re-selecting a similar webpage template to transmit an incremental file in the case that the webpage template changes slightly, it is feasible to compare a webpage template of which the coverage rate is less than a first preset coverage rate threshold with a webpage template of which the coverage rate is greater than the first preset coverage rate threshold.

The merging unit 90 is configured to, if a difference rate between the webpage template of which the coverage rate is less than the first preset coverage rate threshold and the webpage template of which the coverage rate is greater than the first preset coverage rate threshold is less than a preset difference rate threshold, merge the webpage template of which the coverage rate is less than the first preset coverage rate threshold with the webpage template of which the coverage rate is greater than the first preset coverage rate threshold. The difference rate between the webpage template of which the coverage rate is less than the first preset coverage rate threshold and the webpage template of which the coverage rate is greater than the first preset coverage rate threshold may be a ratio of a difference between two webpage templates calculated with an open-vcdiff algorithm by two templates to the size of the webpage template of which the coverage rate is less than the first preset coverage rate threshold, and the difference rate between the webpage template of which the coverage rate is less than the first preset coverage rate threshold and the webpage template of which the coverage rate is greater than the first preset coverage rate threshold may be used to measure a degree of difference between the webpage template of which the coverage rate is less than the first preset coverage rate threshold and the webpage template of which the coverage rate is greater than the first preset coverage rate threshold.

If the difference rate between the webpage template of which the coverage rate is less than the first preset coverage rate threshold and the webpage template of which the coverage rate is greater than the first preset coverage rate threshold is less than a preset difference rate threshold, it is considered that the webpage template of which the coverage rate is less than the first preset coverage rate threshold is similar to the webpage template of which the coverage rate is greater than the first preset coverage rate threshold, the webpage template of which the coverage rate is less than the first preset coverage rate threshold is merged with the webpage template of which the coverage rate is greater than the first preset coverage rate threshold, and the merging process may be merging data of the webpage template of which the coverage rate is less than the first preset coverage rate threshold into data of the webpage template of which the coverage rate is greater than the first preset coverage rate threshold.

Preferably, in order to conveniently compare the webpage template of which the coverage rate is less than the first preset coverage rate threshold with the webpage template of which the coverage rate is greater than the first preset coverage rate threshold, the comparison unit 80 includes a sorting module and a comparison module, wherein the sorting module is configured to sort the multiple webpage templates according to the sizes of the coverage rates in a descending order; and the comparison module is configured to compare a webpage template sorted in the back with a webpage template sorted in the front.

After the multiple webpage templates are sorted according to the sizes of the coverage rates in a descending order, by comparing the webpage templates in a queue in pairs or one by one, the webpage templates of which the webpage template difference rate is less than the preset difference rate threshold can be merged.

After the webpage templates of which the webpage template difference rate is less than the preset difference rate threshold are merged, it is feasible to obtain indexes of the webpage templates according to a website or a domain name of a webpage, and it is feasible to release data of the webpage templates the indexes of the webpage templates.

In order to facilitate storage and calling, the index unit 60 further includes: a storage module, a calculation module, a third judgment module and a deletion module.

The storage module is configured to, after the webpage template of the webpage is generated according to the webpage data, store multiple webpage templates. In order to facilitate calling of templates, after the webpage templates of the webpage are generated, the generated multiple webpage templates are stored.

The calculation module is configured to calculate a coverage rate of each of the webpage templates. A template near a root directory generally has a better coverage rate, and the template near the root directory is preferentially processed during template searching; therefore, when multiple webpage templates are calculated, the generated webpage templates are sorted according to path depths at first, and an arrangement position of a webpage template in a short path is much closer to the root directory than a webpage template in a deep path.

As the multiple webpage templates have been sorted according to path depths, the coverage rate of each webpage template under one path may be calculated when the coverage rate of each webpage template is calculated. The coverage rate of each webpage template may be a coverage rate of the webpage template relative to all webpage templates under the whole path.

For ease of using a webpage template with a greater coverage rate to transmit an incremental file, it is feasible to perform sorting according to the coverage rates from high to low. At the same time, there are many webpage templates under the same path, it is feasible to intercept a certain number of webpage templates according to path depths in an order from long to short, thus avoiding that many webpage templates are under the same path and the computing speed is reduced.

The third judgment module is configured to judge whether the sum of the coverage rates of the webpage templates under each path reaches a second preset coverage rate threshold. After the coverage rate of each webpage template is calculated, whether the sum of the coverage rates of the webpage templates under each path reaches a second preset coverage rate threshold is judged. If the sum reaches the second preset coverage rate threshold, the path is reserved; if it is judged that the sum of the coverage rates of the webpage templates under each path does not reach the second preset coverage rate threshold, webpage templates under a path where the sum of the coverage rates of the webpage templates does not reach the second preset coverage rate threshold are deleted.

The deletion module is configured to delete webpage templates under a path where the sum of the coverage rates of the webpage templates does not reach the second preset coverage rate threshold. The sum of the coverage rates of the webpage templates does not reach the second preset coverage rate threshold, and all webpage templates under a path where the sum of the coverage rates of the webpage templates does not reach the second preset coverage rate threshold are not necessarily processed and used; therefore, webpage templates under a path where the sum of the coverage rates of the webpage templates does not reach the second preset coverage rate threshold may be deleted to save storage resources.

In the embodiment of the present invention, the webpage template may be one webpage, and one webpage can serve as a webpage template of another webpage. For example, if a webpage A can cover most contents of a webpage B, that is, the webpage A and the webpage B are similar in structure, contents or coding, lots of repeated data exists between the webpage A and the webpage B, and the webpage A can serve as a webpage template of the webpage B; similarly, the webpage B can also serve as a webpage template of the webpage A. One webpage may have one or more webpage templates, and one webpage template may also serve as a template of one or more webpages.

Figure 9:
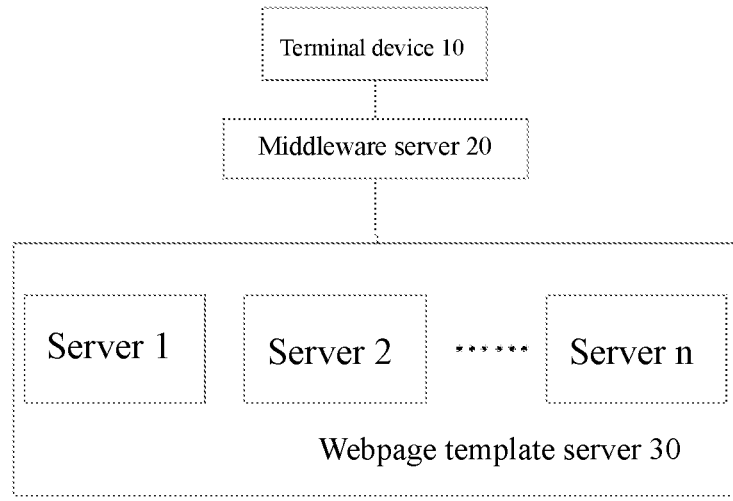
FIG. 9 is a schematic block diagram of connections of a webpage template server, a middleware server and a terminal device according to an embodiment of the present invention.

FIG. 9 is a schematic block diagram of connections of a webpage template server, a middleware server and a terminal device according to an embodiment of the present invention.

As shown in FIG. 9, a terminal device 10 is configured to send a webpage browsing request to a middleware server 20, receiving differential data returned by the middleware server 20 in response to the webpage browsing request, and displaying a requested webpage according to webpage template data corresponding to the differential data locally stored by the terminal device 10 and the differential data, wherein the differential data is generated in a webpage template server 30 based on webpage data of the requested webpage and webpage template data corresponding to the webpage data. When browsing a webpage, a user operates the terminal device 10 and sends a browsing request through the terminal device 10; at this point, the terminal device 10 receives a webpage browsing request and sends the webpage browsing request to the middleware server 20. The user can make a browsing request to the terminal device 10 through a click action.

The middleware server 20 is configured to, according to the received webpage browsing request, acquire data of the requested webpage and forward the data to the webpage template server 30, and upon receipt of the differential data returned by the webpage template server 30, forward the differential data to the terminal device 10.

The webpage template server 30 is configured to, based on the webpage data received from the middleware server 20 and locally acquired webpage template data corresponding to the webpage data, generate differential data between the webpage data and the webpage template data and forwarding the differential data to the middleware server 20.

Differential data exists between a webpage and a corresponding webpage template, and when webpage data is transmitted, if the terminal device 10 has a webpage template locally, only the differential data is transmitted, and it may not be necessary to transmit all data of the webpage.

When the webpage template server 30 cannot acquire a webpage template matching with a webpage to be displayed, the middleware server 20 directly returns the acquired webpage data.

The webpage template server 30 of the present invention may further generate webpage template data of a new webpage template.

The webpage template server 30 of the present invention generates webpage template data of a new webpage template, which may be that the webpage template server generates the webpage template data in advance by receiving the webpage data forwarded by the middleware server. In the method of receiving, in advance, by the webpage template server, the webpage data forwarded by the middleware server, as the webpage template server 30 receives a large amount of webpage data from the middleware server 20, in the embodiment of the present invention, a Hadoop (distributed system infrastructure) cluster may be used to store and calculate data. That is, the webpage template server 30 is a server cluster and consists of multiple servers. The server cluster uses a Hadoop-based HBase (distributed, column-oriented open source database) database to store webpage data, template data, template indexes and so on. The webpage template data is generated by using a MapReduce (large-scale data set concurrent operation method) computing framework. The Hadoop cluster is a natural distributed storage and computing framework. It is only necessary to increase the number of servers that generate webpage templates in the webpage template server 30, and the cluster can be horizontally expanded, which thus has good disaster tolerance capability.

When the webpage template server 30 is a server cluster, the webpage template server 30 is configured to, based on the webpage data received from the middleware server 20 and locally acquired webpage template data corresponding to the webpage data, generate differential data between the webpage data and the webpage template data and forward the differential data to the middleware server 20. Herein, the expression "locally acquired" means acquiring from the server cluster.

It can be known from the above analysis that repeated data as well as differential data exists between the webpage and the webpage template, wherein the differential data is data existing in the webpage but not existing in the webpage template. Herein, the webpage data includes structural data, content data or coding data of the webpage, and the data is sent from the middleware server 20 to the terminal device 10 or sent from the terminal device 10 to the middleware server 20 via a radio communication network or the Internet. The webpage template of the present invention may be stored in a cache in the form of code; therefore, when the webpage is displayed, the terminal device 10 is required to decode the webpage template data and the differential data, and the webpage template data and the differential data are restored together to obtain a webpage to be displayed.

As the differential data is smaller than the webpage data, in the case that the terminal device 10 has a webpage template, only differential data can be transmitted when the webpage data is transmitted. The differential data is a part of the webpage data; therefore, the method of transmitting the differential data may be the same as the method of transmitting the webpage data, which is transmitted via a network such as a radio communication network or the Internet. The middleware server 20 sends the differential data to the terminal device 10, the terminal device 10 calls a webpage template corresponding to the webpage, which thus implements display of the webpage, can effectively save network resources, reduces occupation of bandwidth, and increases the loading speed of the webpage, further increasing the speed at which the user browses the webpage.

Figure 10:
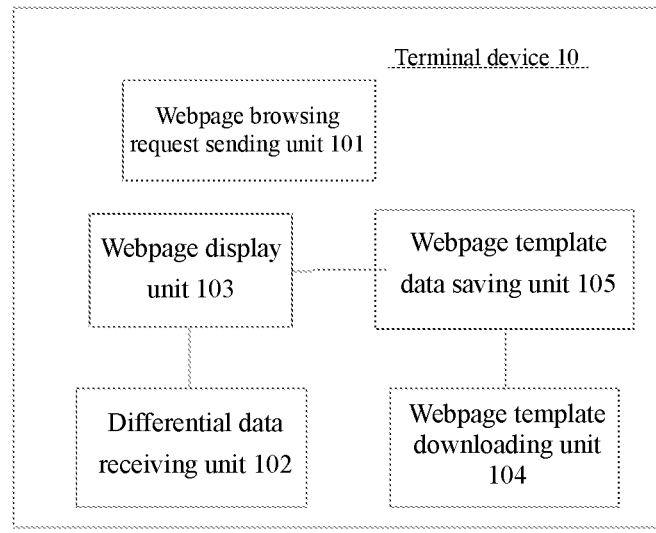
FIG. 10 is a schematic block diagram of one embodiment of a terminal device according to an embodiment of the present invention.

FIG. 10 is a schematic block diagram of one embodiment of a terminal device according to an embodiment of the present invention.

As shown in FIG. 10, the terminal device 10 includes a webpage browsing request sending unit 101, a differential data receiving unit 102 and a webpage display unit 103.

The webpage browsing request sending unit 101 is configured to send a webpage browsing request to a middleware server 20; before the webpage browsing request sending unit 101 sends the webpage browsing request to the middleware server 20, the terminal device 10 can locally find a webpage template matching with a webpage of the webpage browsing request. If the matched webpage template is found, it is necessary to carry a first template ID list containing an ID of the webpage template in the webpage browsing request, and if the matched webpage template is not found, the list is empty. The locally found webpage template matching with the webpage of the webpage browsing request may be queried according to a webpage address of the requested webpage, or queried by processing the webpage to generate a webpage label, for example, generate a hash value label and so on. A matching principle of the webpage and the webpage template is determined according to demands of different websites or the webpage, for example, in the case of a coverage rate manner. That is, only when a coverage rate between a webpage template of a webpage A and the webpage A reaches a predetermined value, can it be considered that the webpage template matches with the webpage A, and it is needed to query for, in a webpage template library, a webpage template the coverage rate between which and the webpage A reaches the predetermined value. It should be noted that the matching manner between the webpage template and the webpage may also be other manners such as a compression ratio except the coverage rate, which is only illustrated herein but not enumerated.

It should be noted that, in order to reduce the burden of transmitting resources and increase the response speed of the terminal device 10, it is necessary to limit the size of the first template ID list or include the number of template IDs within a certain range value. For example, a request packet can only carry 5 template IDs at most each time.

The differential data receiving unit 102 is configured to receive the differential data returned by the middleware server 20 in response to the webpage browsing request, wherein the differential data is generated in the webpage template server 30 based on webpage data of the requested webpage and webpage template data corresponding to the webpage data, and the webpage display unit 103 is configured to display the requested webpage according to webpage template data corresponding to the differential data locally stored by the terminal device 10 and the differential data. A TCP/IP protocol is used for transmission. If the data received by the webpage display unit 103 is the differential data, the requested webpage is displayed according to webpage template data corresponding to the differential data locally stored by the terminal device 10 and the differential data, and if the data received is the webpage data, webpage display can be performed directly.

As the webpage template is transmitted in a communication network in the form of code, the webpage display unit 103 needs to restore the code data, which displays the original webpage together with the differential data.

In consideration of the storage capability of the terminal device 1010, in the present invention, the number of the webpage templates locally stored by the terminal device 10 or the total size of the webpage template data is limited, and it is feasible to set a threshold, for example, only 100 templates can be stored at most and the total size does not exceed 10 MB. If it exceeds the threshold, templates may be eliminated according to LRU (Least Recently Used), i.e., a LRU page replacement algorithm. By using the LRU algorithm, webpage templates that have been used less recently and will not be used in a longer time in the future may be deleted. That can save storage resources of the terminal device 10.

In another embodiment of the present invention, the terminal device 10 further includes a webpage template downloading unit 104 and a webpage template data saving unit 105.

The webpage template downloading unit 104 is configured to, after a webpage template ID not belonging to a first webpage template ID list is received from the middleware server 20, based on the webpage template ID, download the corresponding webpage template data from the webpage template server 30 via the middleware server 20. The webpage template downloading unit 104 is an independent worker thread, which can intelligently download a template request when the network is idle or in a wifi environment, avoid occupying bandwidth and affecting the user's browsing experience.

The webpage template data saving unit 105 is configured to store the webpage template data downloaded by the webpage template downloading unit 104 associatively with the corresponding webpage template ID, and configured to store the webpage template data of the terminal device 10; like the previous embodiment, in consideration of the storage capability of the terminal device 10, the number of the templates locally stored by the webpage template data saving unit 105 or the total size of the webpage template data is limited, and a threshold may be set, for example, only 100 templates can be stored at most and the total size does not exceed 10 MB. If it exceeds the threshold, templates may be eliminated according to LRU (Least Recently Used), i.e., a LRU page replacement algorithm. By using the LRU algorithm, webpage templates that have been used less recently and will not be used in a longer time in the future may be deleted, which can save storage resources of the terminal device 10.

The terminal device 10 of the present invention may include a mobile terminal, a PDA, an IPad and other terminal devices that have a display function and can browse a webpage.

Figure 11:
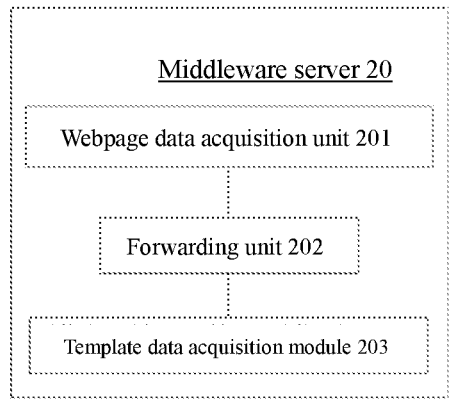
FIG. 11 is a schematic block diagram of one embodiment of a middleware server according to an embodiment of the present invention.

FIG. 11 is a schematic block diagram of one embodiment of a middleware server according to an embodiment of the present invention.

As shown in FIG. 11, a middleware server 20 includes a webpage data acquisition unit 201, configured to, upon receipt of a webpage browsing request sent by a terminal device 10, acquire requested webpage data; acquisition of the webpage data may first query from the cache of the middleware server 20 whether there is cached webpage data, and if no, it is necessary to access a target website server to acquire the webpage data.

A forwarding unit 202 is further included, configured to forward the acquired webpage data to the webpage template server 30, and upon receipt of differential data returned by a webpage template server 30, forward the differential data to the terminal device 10. The forwarding unit 202 may use a TCP/IP protocol to transmit data. While the acquired webpage data is forwarded to the webpage template server 30, a webpage website requested by the webpage browsing request and a first template ID list are also sent together to the webpage template server 30.

When the data received is not the differential data but a recommended template ID returned by the webpage template server 30, the forwarding unit 202 sends to the terminal device 10 the recommended template ID, as well as the webpage data acquired by the webpage data acquisition unit 201.

In another preferred embodiment of the present invention, the middleware server 20 further includes a template data acquisition module 203 configured to receive a template ID of webpage template data to be downloaded sent by the webpage template downloading unit 104 of the terminal device 10, and download the webpage template data from the webpage template server 30 through the template ID. Then, the webpage template data is sent to a forwarding module 202, which is sent by the forwarding module 202 to the terminal device 10 and is stored by a webpage template data saving unit 105 of the terminal device 10.

Figure 12:
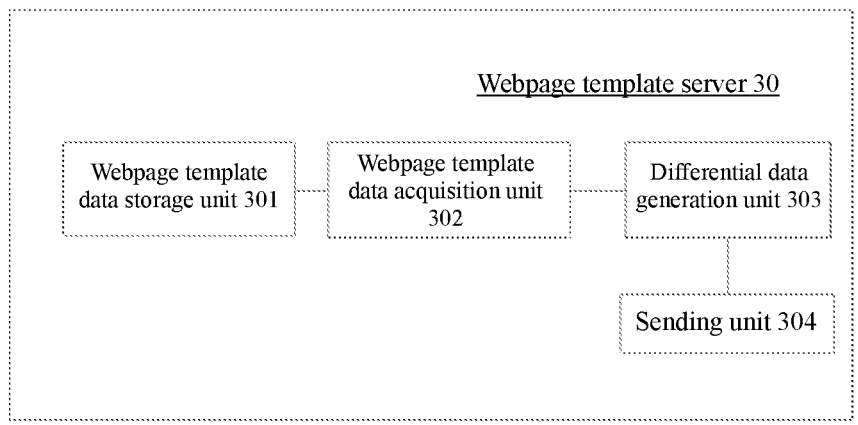
FIG. 12 is a schematic block diagram of one embodiment of a webpage template server according to an embodiment of the present invention.

FIG. 12 is a schematic block diagram of one embodiment of a webpage template server according to an embodiment of the present invention.

As shown in FIG. 12, the webpage template server 30 includes a webpage template data storage unit 301, a webpage template data acquisition unit 302, a differential data generation unit 303 and a sending unit 304.

The webpage template data storage unit 301 is configured to store webpage template data. In the webpage template data storage unit 301, specifically, webpage template IDs and webpage template data are stored associatively.

The webpage template data acquisition unit 302 is configured to acquire, from the webpage template data storage unit 301, webpage template data corresponding to webpage data received. The webpage template data acquisition unit 302 acquires the webpage template data from the webpage template data storage unit 301 through a first template ID list or acquires the webpage template data from the webpage template data storage unit 301 through a first template ID list and a webpage address of the requested webpage.

The differential data generation unit 303 is configured to generate differential data between the webpage data and the webpage template data based on the webpage data received from the middleware server 20 and the webpage template data corresponding to the webpage data.

The sending unit 304 is configured to send the generated differential data to the middleware server 20.

Figure 13:
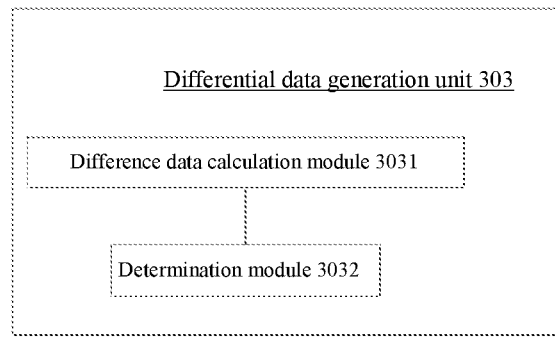
FIG. 13 is a schematic block diagram of one embodiment of a differential data generation unit of a webpage template server according to an embodiment of the present invention.

FIG. 13 is a schematic block diagram of one embodiment of a differential data generation unit of a webpage template server according to an embodiment of the present invention.

In the present invention, when the terminal device 10 locally stores webpage templates matching with the requested webpage, a first template ID list of IDs of all the matched templates along with the webpage browsing request will be sent to the middleware server 20. At the same time, the middleware server 20 may forward the first template ID list to the webpage template server 30. At this point, the webpage template data acquisition unit 302 of the webpage template server 30 is configured to sequentially acquire the webpage template IDs in the first webpage template ID list, and acquire the webpage template data from the webpage template data storage unit 301 based on the acquired webpage template IDs, and at this point, the differential data generation unit 303 includes a difference data calculation module 3031 and a determination module 3032 as shown in FIG. 5.

The difference data calculation module 3031 is configured to calculate difference data between the webpage data and the webpage template data acquired from the webpage template data storage unit 301. The difference data calculation module 3031 calculates the webpage template data and the webpage data by using a differential algorithm.

The determination module 3032 is configured to, when a compression ratio between the calculated difference data and the webpage data is less than a first predetermined threshold, determine the difference data as the differential data, and when the compression ratio between the calculated difference data and the webpage data is not less than the first predetermined threshold, the processing processes of the webpage template data acquisition unit 302 and the differential data generation unit 303 are repeated until the differential data is generated.

The compression ratio between the difference data and the webpage data is a ratio of the value of the difference data after compression to data of the webpage data after compression, and when the compression ratio is less, it indicates that the difference between the webpage template data corresponding to the difference data and the webpage data is less.

Figure 14:
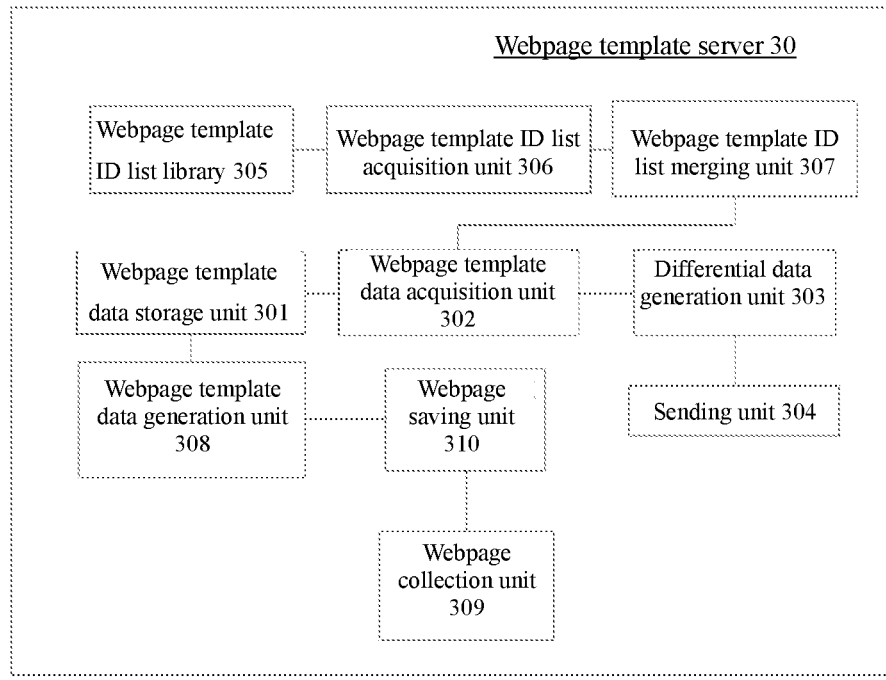
FIG. 14 is a schematic block diagram of a second embodiment of a webpage template server according to an embodiment of the present invention.

FIG. 14 is a schematic block diagram of a second embodiment of a webpage template server according to an embodiment of the present invention.

As shown in FIG. 14, when the terminal device 10 locally stores webpage templates matching with the requested webpage, a first template ID list of IDs of all the matched templates along with the webpage browsing request will be sent to the middleware server 20. At the same time, the middleware server 20 may forward the first template ID list and a requested webpage address to the webpage template server 30. That is, the webpage browsing request includes a webpage address and a first webpage template ID list, and at this point, the webpage template server 30 includes:

A webpage template ID list library 305 configured to store a second webpage template ID list associatively with the webpage address. The second webpage template ID list is a template ID list corresponding to an address of a webpage requested to be browsed recommended by the webpage template server 30. Template IDs of webpage template data matching with the address of the webpage stored in the webpage template server 30 make up the second webpage template ID list recommended by the webpage template server 30.

A webpage template ID list acquisition module 306 configured to acquire the corresponding second webpage template ID list from the webpage template ID list library 305 according to a webpage address of a webpage requested to be browsed.

A webpage template ID list merging unit 307 configured to merge the first webpage template ID list and the second webpage template ID list into a third webpage template ID list. The method in which the webpage template ID list merging unit 307 merges the first webpage template ID list and the second webpage template ID list into a third webpage template ID list is as follows: merging webpage template IDs in the first webpage template ID list and the second webpage template ID list according to priorities, to form a third webpage template ID list, wherein an intersection between the first webpage template ID list and the second webpage template ID list has the highest priority, the remaining part in the first webpage template ID list takes second place, and the remaining part in the second webpage template ID list is the lowest.

After the third webpage template ID list is formed, the webpage template data acquisition unit 302 sequentially acquires webpage template IDs in the third webpage template ID list, and acquires webpage template data from the webpage template data storage unit 301 based on the webpage template IDs acquired. At this point, the process that the difference data calculation module 3031 and the determination module 3032 included in the difference data generation unit generate the differential data is the same as that in the embodiment shown in FIG. 13.

In a preferred embodiment of the present invention, in order to avoid that the differential data generation unit 303, when generating the differential data, conducts too much calculation after the calculation fails to affect the system operation efficiency, a counting unit (not shown) is further provided, and configured to, when the compression ratio between the calculated difference data and the webpage data is not less than the first predetermined threshold, count the number of times of calculation of the differential data calculation unit, and when the number of times of calculation does not exceed a second predetermined threshold, the webpage template data acquisition unit 302 is configured to acquire a next webpage template ID, and acquire the webpage template data from the webpage template data storage unit 301 based on the next webpage template ID, and when the number of times of calculation exceeds the second predetermined threshold, the webpage template server 30 returns a differential data generation failure message to the middleware server 20, in order that the middleware server 20 returns webpage data to the terminal device 10 for display upon receipt of the differential data generation failure message.

In another preferred embodiment of the present invention, the webpage template server 30 further includes a differential data saving unit (not shown), configured to store the differential data associatively with the webpage template ID and the webpage address; and a differential data query unit (not shown), configured to query for the associated differential data in the differential data saving unit according to the webpage template ID and the webpage address, and when the differential data query unit fails to query the associated differential data, the differential data generation unit 303 is configured to generate the differential data. A certain number of differential calculation results are stored, when identical template IDs and webpage requests appear, the differential data generation unit 303 does not need to conduct differential data calculation and can directly acquire the differential data from the differential data saving unit, thus increasing the response speed.

In another preferred embodiment of the present invention, the webpage template server 30 further includes a second judgment unit (not shown), configured to, after the differential data is generated, judge whether a webpage template ID currently used by the webpage template data acquisition unit 302 belongs to the first webpage template ID list, and when the webpage template ID currently used belongs to the first webpage template ID list, the sending unit 304 returns the generated differential data and the webpage template ID currently used to the middleware server 20 which are then forwarded to the terminal device 10 via the middleware server 20, when the webpage template ID currently used does not belong to the first webpage template ID list, the sending unit 304 returns the webpage template ID currently used to the middleware server 20, and the middleware server 20 sends the webpage template ID and the webpage data received to the terminal device 10, for the webpage template downloading unit 104 of the terminal device 10 to download webpage template data corresponding to the webpage template ID at idle or in the case of WIFI.

At the same time, the webpage template server 30 of the present invention may further include a webpage template data generation unit 308, a webpage collection unit 309 and a webpage saving unit 310.

The webpage collection unit 309 is configured to receive webpage data sent from the middleware server 20.

The webpage saving unit 310 is configured to store the webpage data sent from the middleware server 20 received by the webpage collection unit 309.

The webpage template data generation unit 308 is configured to generate webpage template data according to the webpage data sent from the middleware server 20 stored by the webpage saving unit 310, generating a corresponding webpage template ID, storing the webpage template data and the webpage template ID correspondingly into the webpage template data storage unit 301, and storing the webpage template ID and a webpage address correspondingly into the webpage template ID list library 305. The webpage template data generation unit 308 is configured to generate webpage template data according to the webpage data sent from the middleware server, and the webpage template data generation unit 308 rapidly generates the webpage template data by using a specific algorithm. The method of rapidly generating the webpage template data by using a specific algorithm may be generating the webpage template data with a method of generating a hash value for a webpage or a method of line-breaking webpage data; and as the webpage template may be a webpage, it is also feasible to use the webpage per se as a webpage template.

The webpage template data generation unit 308 generates the webpage template data through establishing a new webpage template according to a webpage that a user requests browsing when the differential data generation unit 303 fails to generate differential data, or through generating the webpage template data by the template server 30 by receiving, in advance, the webpage data forwarded by the middleware server 20.

In the embodiment of the present invention, in the method in which the webpage template server 30 generates the webpage template data by receiving the webpage data forwarded by the middleware server 20, as there are lots of webpages accessed through the middleware server 20 every day and the webpage template server 30 can receive webpage data of multiple middleware servers 20, the webpage template server 30 receives a large amount of webpage data from the middleware server 20. In the embodiment of the present invention, a large amount of data may need to be stored and a large number of calculations on the large amount of webpage data to generate webpage templates may be performed. Therefore, in the embodiment of the present invention, a Hadoop (distributed system infrastructure) cluster may be used to store and calculated the data. That is, the webpage template server 30 is a server cluster and includes multiple servers. The webpage template data generation unit 308 may be disposed in the multiple servers of the server cluster. The server cluster uses a Hadoop-based HBase (distributed, column-oriented open source database) database to store webpage data, template data, template indexes and so on. The template is generated by using a MapReduce (large-scale data set concurrent operation method) computing framework. The Hadoop cluster is a natural distributed storage and computing framework. It is only necessary to increase the number of servers that generate webpage templates in the webpage template server 30, that is, the servers including the webpage template data generation unit 308 are increased, and the cluster can be horizontally expanded, which thus has good disaster tolerance capability. In a webpage display system of the present invention, when the webpage template server 30 returns a template ID list to the middleware server 20, in order not to affect the speed at which a user browses a webpage, the size of the template ID list is limited, for example, the webpage template IDs returned each time can only be 5 at most.

In another preferred embodiment of the present invention, the webpage template server 30 may further include a webpage template deletion unit (not shown) configured to, when it is judged that the number of webpage templates in the webpage template data storage unit 301 or the size of occupied space exceeds a predetermined threshold, delete webpage template data in the webpage template data storage unit 301 which has been least recently used. The least recently used refers to that webpage template data which has not been used for a long time may not be used in a longer period of time in the future. Then, according to the least recently principle, webpage template data which has not been used in a recent period of time and webpage template data which may not be used in a longer period of time in the future are obtained through analysis, and the webpage template deletion unit deletes the webpage template data which has not been used in a recent period of time.

It is worth noting that the webpage display system of the present invention may only include a terminal device and a server. That is, the webpage template server 30 of the present invention cannot be considered to be a limitation to a certain physical server, the webpage template server 30 may be a server, in order to reduce calculation and storage pressure, the webpage template server 30 may also be a server cluster, and likewise, the function of the middleware server 20 may be completed in the same physical server and may also be completed in a server cluster. The functional modules included in the middleware server 20 and the webpage template server 30 of the present invention may be disposed in multiple servers in a distributed manner. For example, it is feasible to set one or more servers that include the webpage template data generation unit 308, the webpage collection unit 309 and the webpage saving unit 310 and set one or more servers that include the webpage template data acquisition unit 302 and the differential data generation unit 303, and the servers make up the server cluster of the webpage template server 30 of the present invention.

According to the webpage display system of the present invention, differential data between a webpage template and webpage data is stored and calculated by setting a webpage template server 30, a middleware server 20 sends the differential data to a terminal device 10, and the terminal device 10 locally calls a webpage template corresponding to the differential data, to implement webpage display. When the webpage data is transmitted, only differential data is transmitted, while the differential data is less compared to the webpage data. Network resources can be effectively saved, occupation of bandwidth is reduced, and the loading speed of a webpage is increased, thereby further increasing the speed at which a user browses the webpage.

Figure 15:
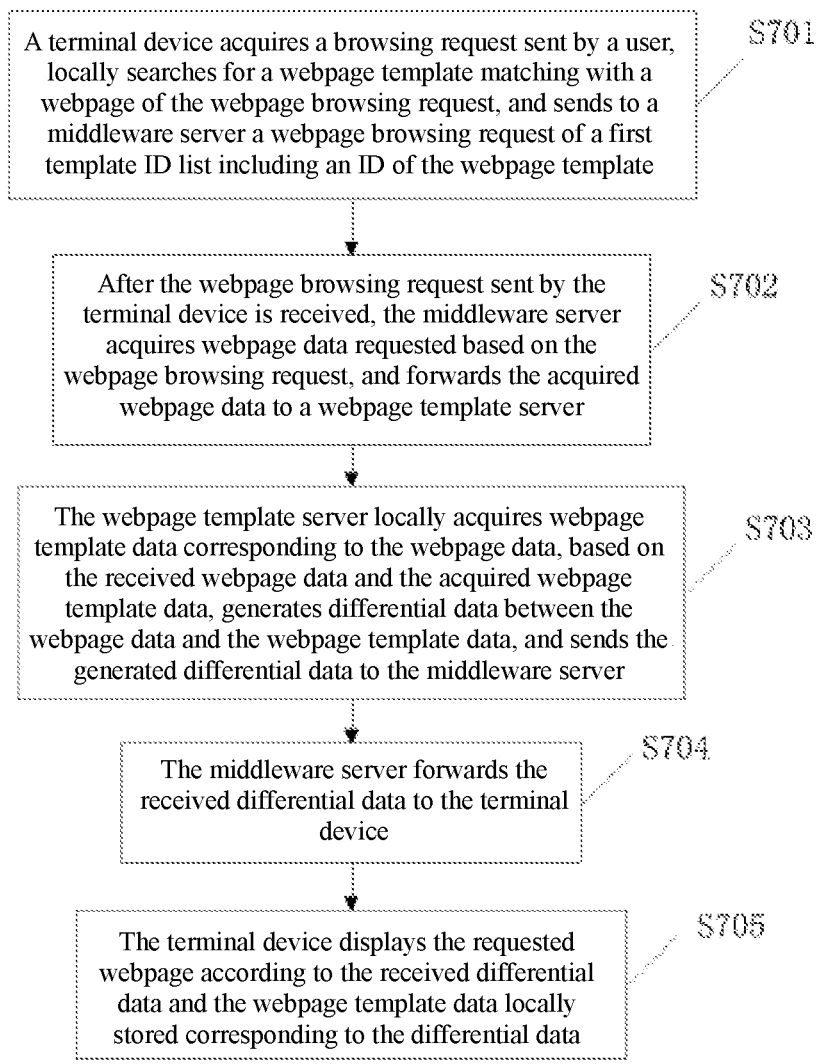
FIG. 15 is a flow chart of an embodiment of a method of implementing webpage display by using a webpage template according to the present invention.

FIG. 15 is a flow chart of an embodiment of a method of implementing webpage display by using a webpage template according to the present invention.

An embodiment of the present invention provides a webpage display method. The method is configured to transmit webpage data, and can increase a webpage display speed.

The webpage display method according to the embodiment of the present invention can be performed through the webpage display system provided in the embodiment of the present invention or a webpage display system, and the webpage display system provided in the embodiment of the present invention or the webpage display system may also be configured to perform the webpage display method provided in the embodiment of the present invention.

As shown in FIG. 15, the webpage display method includes the following steps.

Step S701. A terminal device acquires a browsing request sent by a user, locally searches for a webpage template matching with a webpage of the webpage browsing request, and sends to a middleware server a webpage browsing request of a first template ID list including an ID of the webpage template. If the webpage template is not found, the list is empty. The locally found webpage template matching with the webpage of the webpage browsing request may be queried according to a requested webpage address, or queried by processing the webpage to generate a webpage label, for example, generate a hash value label and so on. A matching principle of the webpage and the webpage template is determined according to demands of different websites or the webpage, for example, in the case of a coverage rate manner, that is, only when a coverage rate between a webpage template of a webpage A and the webpage A reaches a predetermined value, can it be considered that the webpage template matches with the webpage A. When browsing a webpage, the user makes a browsing request to the terminal device, and the terminal device acquires the browsing request sent by the user. The terminal device is connected with the middleware server via a radio communication network or the Internet, to achieve communication and data transmission between the terminal device and the middleware server. The user can make the browsing request to the terminal device through a click action.

As a preferred embodiment, in order to reduce the load of transmitting resources and increase the response speed of the terminal device, it is necessary to limit the size of the first template ID list of the webpage browsing request sent to the middleware server or the number of the template IDs included. For example, a request packet can only carry 5 template IDs at most each time.

It should be noted that the matching manner between the webpage template and the webpage may also be other manners such as a compression ratio except the coverage rate, which is only illustrated herein but not enumerated.

Then, in step S702, after the webpage browsing request sent by the terminal device is received, the middleware server acquires webpage data requested based on the webpage browsing request, and forwards the acquired webpage data to a webpage template server.

The middleware server may locally store some webpage addresses and webpage data associatively. After the webpage browsing request sent by the terminal device is received, whether a requested webpage exists is searched locally according to the webpage browsing request, or the webpage is acquired from a webpage server. The middleware server may send the requested webpage address to the webpage template server while forwarding the acquired webpage data to the webpage template server.

Step S703. The webpage template server locally acquires webpage template data corresponding to the webpage data, based on the received webpage data and the acquired webpage template data, generates differential data between the webpage data and the webpage template data, and sends the generated differential data to the middleware server.

The webpage template data corresponding to the webpage data is data of the webpage template matching with the webpage, and herein, the matching principle may be the same as or different from that in the above step. Identical data exists between the webpage and the corresponding webpage template, but different data differentials also exist therebetween. The differential data may be data existing in the webpage but not existing in the webpage template. The webpage data herein includes structural data, content data or coding data of the webpage, and the data is sent from the middleware server to the terminal device or sent from the terminal device to the middleware server via a radio communication network or the Internet.

In a preferred embodiment of the webpage display method of the present invention, the webpage template server locally acquires webpage template data corresponding to the webpage data, and after differential data between the webpage data and the webpage template data is generated based on the received webpage data and the acquired webpage template data, the method further includes storing, by a differential data saving unit, differential data of webpage template IDs and webpage addresses associatively. At the same time, when receiving the webpage data sent by the middleware server, the requested webpage website and the webpage template ID corresponding to the website, the webpage template server queries for associated differential data in the differential data saving unit according to the webpage template ID and the webpage address, and when the associated differential data is not queried in the differential data query unit, the method proceeds to step S703.

Step S704. The middleware server forwards the received differential data to the terminal device.

Step S705. The terminal device displays the requested webpage according to the received differential data and the webpage template data locally stored corresponding to the differential data. After receiving the differential data transmitted from the network, the terminal device locally searches for webpage template data through the webpage template ID or a label that can represent a webpage template and the like, so that the webpage can be displayed according to the webpage template data and the differential data. The webpage template data includes coding information and other data of the webpage template. After the webpage template data is obtained, the webpage is displayed according to the webpage template data and the differential data, wherein the webpage data can be obtained by decoding the webpage template data and the differential data.

As the differential data is less than the webpage data, in the case that the terminal device locally has a webpage template, only differential data can be transmitted when the webpage data is transmitted. The differential data is a part of the webpage data; therefore, the method of transmitting the differential data may be the same as the method of transmitting the webpage data, which is transmitted via a network such as a radio communication network or the Internet. The middleware server sends the differential data to the terminal device, the terminal device calls a webpage template corresponding to the webpage, which thus implements display of the webpage. The size of the differential data is far less than that of the webpage data, and thus network resources occupied by transmission of the differential data is also fewer than those occupied by transmission of the webpage data, which improves the transmission efficiency of the webpage data and further increases the loading speed of the webpage.

Figure 16A:
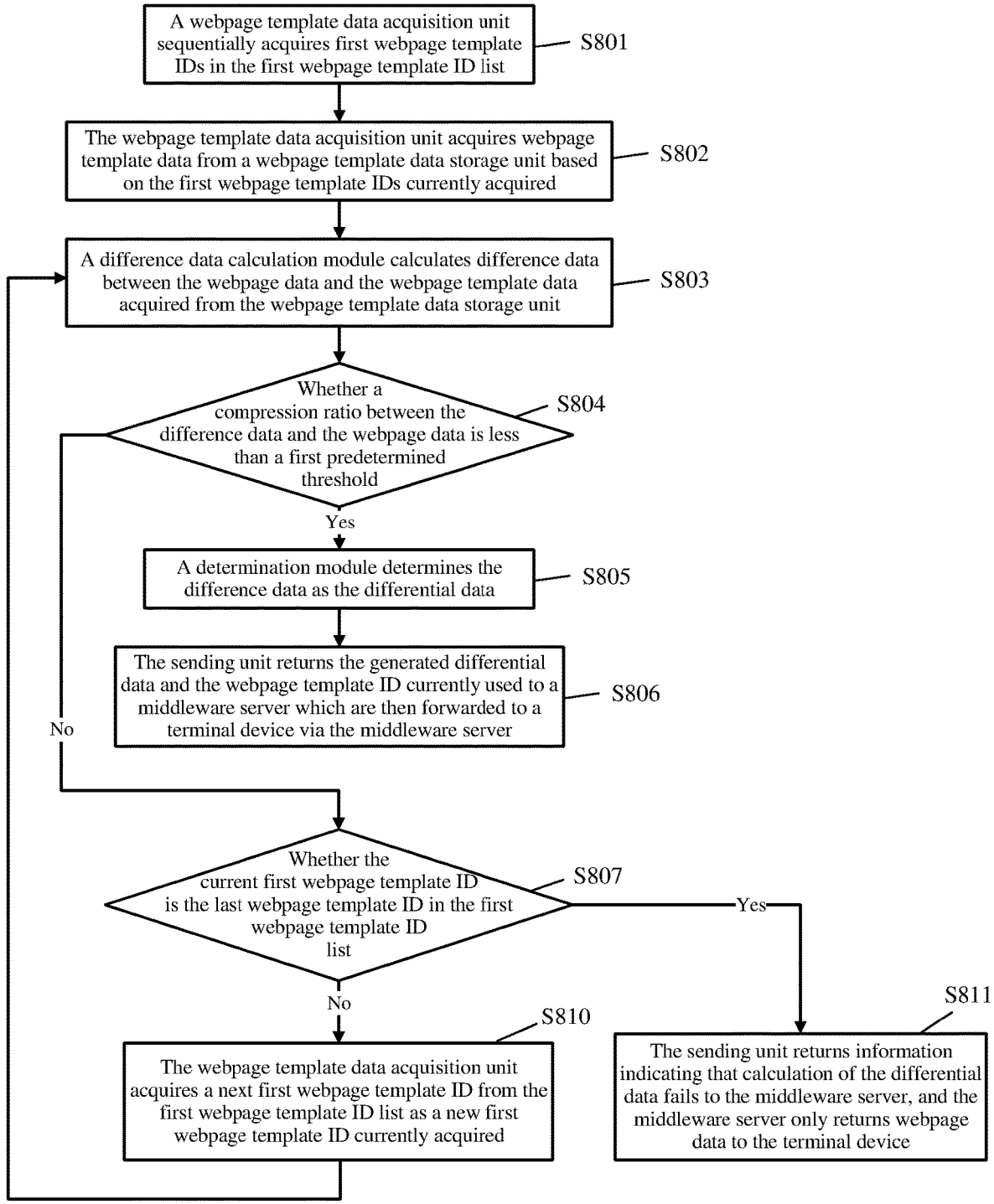
FIG. 16a and FIG. 16b are flow charts of a first embodiment of step S703 in the case that a webpage browsing request includes a first webpage template ID list in the method of implementing webpage display by using a webpage template according to the present invention.
Figure 16B:
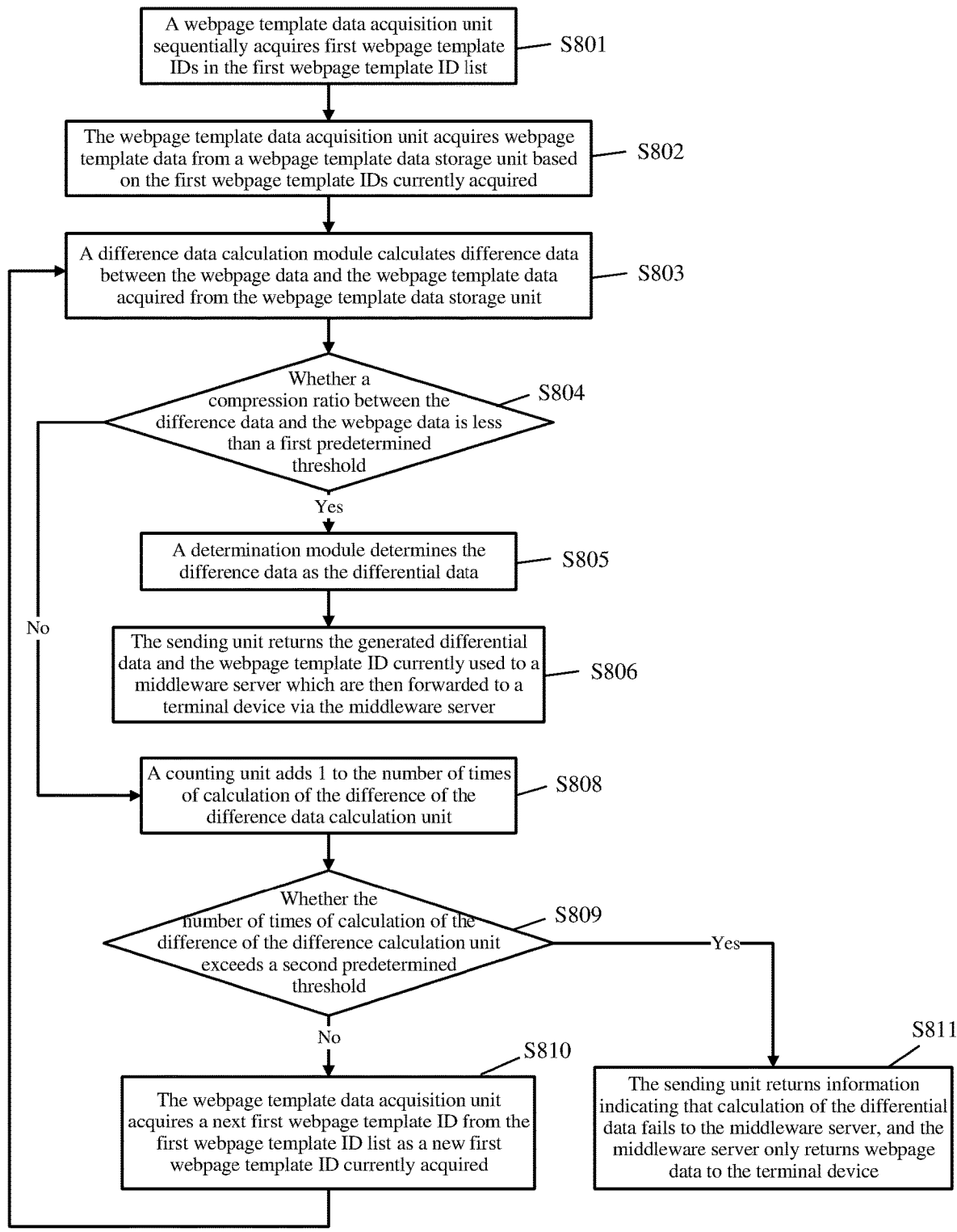

FIG. 16 is a flow chart of a first embodiment of step S703 in the case that a webpage browsing request includes a first webpage template ID list in the method of implementing webpage display by using a webpage template according to the present invention.

In the case that the webpage browsing request includes a first webpage template ID list, as shown in FIG. 16, the method proceeds to step S801, in which a webpage template data acquisition unit sequentially acquires first webpage template IDs in the first webpage template ID list, and then proceeds to step S802, in which the webpage template data acquisition unit acquires webpage template data from a webpage template data storage unit based on the first webpage template IDs currently acquired.

Then, in step S803, a difference data calculation module calculates difference data between the webpage data and the webpage template data acquired from the webpage template data storage unit.

Then, in step S804, whether a compression ratio between the difference data and the webpage data is less than a first predetermined threshold is judged.

When the compression ratio between the calculated difference data and the webpage data is less than the first predetermined threshold, the method proceeds to step S805, in which a determination module determines the difference data as the differential data, and then the method proceeds to step S806, in which the sending unit returns the generated differential data and the webpage template ID currently used to a middleware server which are then forwarded to a terminal device via the middleware server.

When the compression ratio between the calculated difference data and the webpage data is not less than the first predetermined threshold, the method proceeds to step S807, in which whether the current first webpage template ID is the last webpage template ID in the first webpage template ID list is judged. If no, the method proceeds to step S810, in which the webpage template data acquisition unit acquires a next first webpage template ID from the first webpage template ID list as a new first webpage template ID currently acquired, and then the method goes back to step S802. If yes, the method proceeds to step S811, in which the sending unit returns information indicating that calculation of the differential data fails to the middleware server, the middleware server only returns webpage data to the terminal device, and the process ends.

In order to prevent that the number of the webpage template IDs in the first webpage template ID is too much to result in a too large calculation quantity of the webpage template server. As a preferred embodiment, step S807 of this embodiment can be replaced with S808 and S809, step S808 is adding, by a counting unit, 1 to the number of times of calculation of the difference of the difference data calculation unit, and step S809 is judging whether the number of times of calculation of the difference of the difference calculation unit exceeds a second predetermined threshold. When the number of times of calculation does not exceed the second predetermined threshold, the method proceeds to step S810. When the number of times of calculation exceeds the second predetermined threshold, the method proceeds to step S811.

Figure 17A:
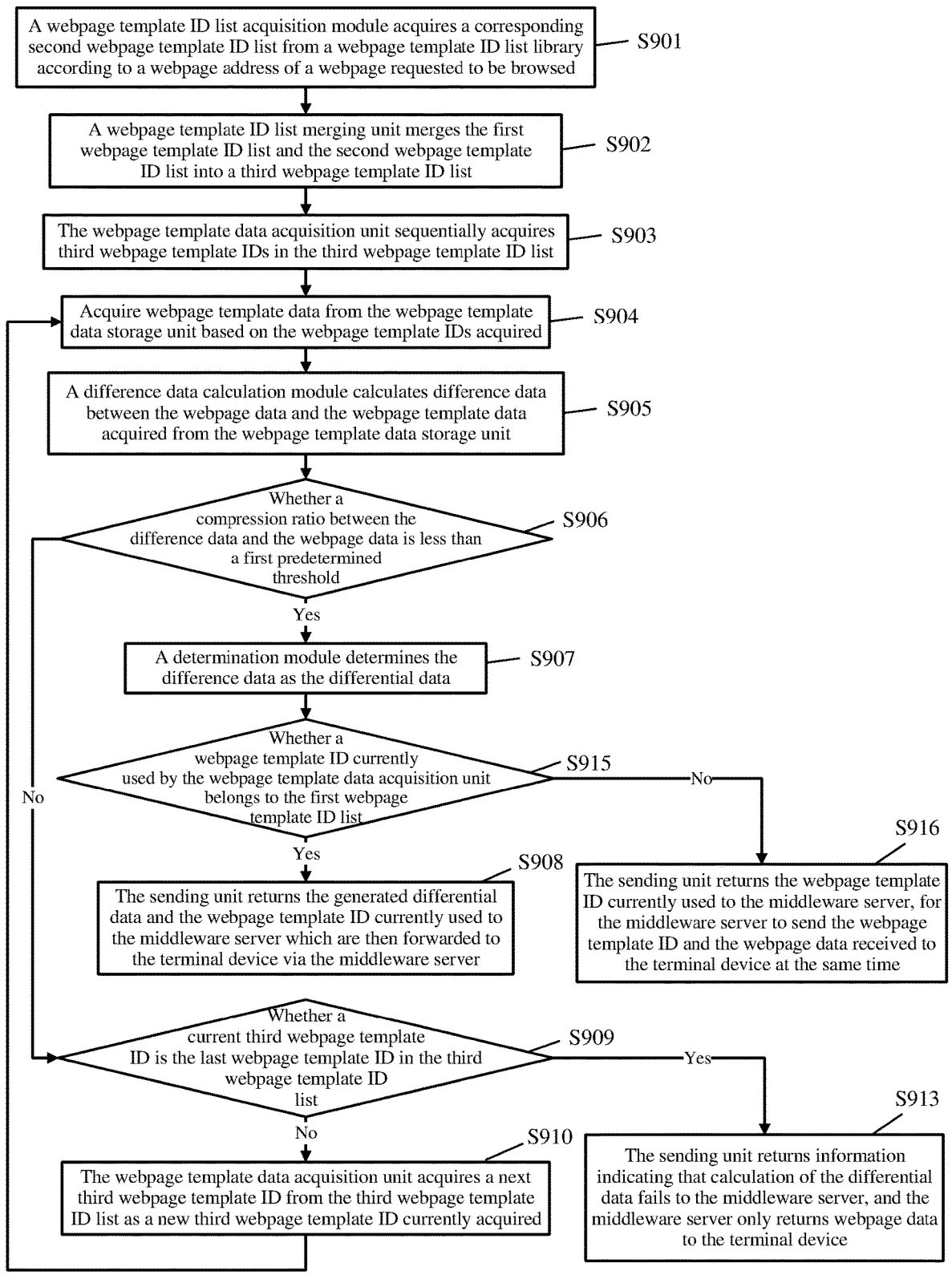
FIG. 17a and FIG. 17b are flow charts of a second embodiment of step S703 in the case that a webpage browsing request includes a first webpage template ID list in the method of implementing webpage display by using a webpage template according to the present invention.
Figure 17B:
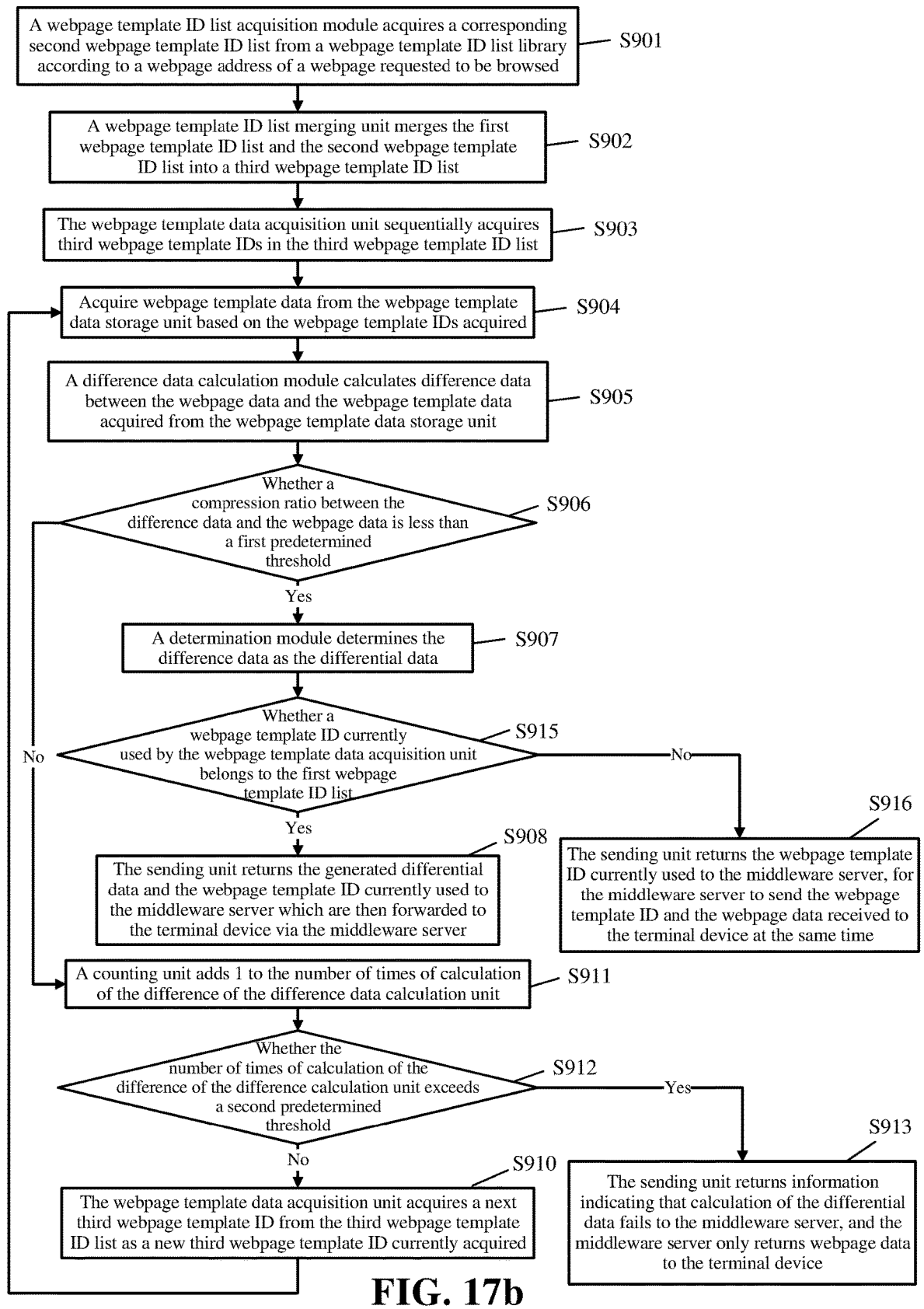

FIG. 17 is a flow chart of a second embodiment of step S703 in the case that a webpage browsing request includes a first webpage template ID list in the method of implementing webpage display by using a webpage template according to the present invention.

As shown in FIG. 17, after a webpage template server receives a webpage browsing request including a first webpage template list, in step S901, a webpage template ID list acquisition unit acquires a corresponding second webpage template ID list from webpage template ID list library according to a webpage address of a webpage requested to be browsed. The second webpage template ID list is stored associatively with webpage addresses in a webpage template ID list library.

Then, in step S902, a webpage template ID list merging unit merges the first webpage template ID list and the second webpage template ID list into a third webpage template ID list. In this step, a method of generating the third webpage template ID list may be merging webpage template IDs in the first webpage template ID list and the second webpage template ID list according to priorities, to form a third webpage template ID list, wherein an intersection between the first webpage template ID list and the second webpage template ID list has the highest priority, the remaining part in the first webpage template ID list takes second place, and the remaining part in the second webpage template ID list is the lowest.

Then, in step S903, the webpage template data acquisition unit sequentially acquires webpage template IDs in the third webpage template ID list. Then, in step S904, webpage template data is acquired from the webpage template data storage unit based on the webpage template IDs acquired.

After the webpage template data is acquired, in step S905, a difference data calculation module calculates difference data between the webpage data and the webpage template data acquired from the webpage template data storage unit.

Then, in step S906, whether a compression ratio between the difference data and the webpage data is less than a first predetermined threshold is judged.

When the compression ratio between the calculated difference data and the webpage data is less than the first predetermined threshold, the method proceeds to step S907, in which a determination module determines the difference data as the differential data. Then, the method proceeds to step S908, in which the sending unit returns the generated differential data and the webpage template ID currently used to the middleware server which are then forwarded to the terminal device via the middleware server.

When the compression ratio between the calculated difference data and the webpage data is not less than the first predetermined threshold, the method proceeds to step S909, in which whether a current third webpage template ID is the last webpage template ID in the third webpage template ID list is judged. If no, the method proceeds to step S910, in which the webpage template data acquisition unit acquires a next third webpage template ID from the third webpage template ID list as a new third webpage template ID currently acquired, and then the method goes back to step S904. If yes, the method proceeds to step S913, in which the sending unit returns information indicating that calculation of the differential data fails to the middleware server, the middleware server only returns webpage data to the terminal device, and the process ends.

In order to prevent that the number of the webpage template IDs in the third webpage template ID is too much to result in a too large calculation quantity of the webpage template server. As a preferred embodiment, step S909 of this embodiment can be replaced with S911 and S912, step S911 is adding, by a counting unit, 1 to the number of times of calculation of the difference of the difference data calculation unit, and step S912 is judging whether the number of times of calculation of the difference of the difference calculation unit exceeds a second predetermined threshold. When the number of times of calculation does not exceed the second predetermined threshold, the method goes back to step S910. When the number of times of calculation exceeds the second predetermined threshold, the method proceeds to step S913.

Before the method proceeds to step S908, a preferred example of this embodiment further includes step S915, in which a second judgment unit judges whether a webpage template ID currently used by the webpage template data acquisition unit belongs to the first webpage template ID list.

When the webpage template ID currently used belongs to the first webpage template ID list, the method proceeds to step S908.

When the webpage template ID currently used does not belong to the first webpage template ID list, the method proceeds to step S916, in which the sending unit returns the webpage template ID currently used to the middleware server, for the middleware server to send the webpage template ID and the webpage data received to the terminal device at the same time.

Then, a webpage template downloading unit of the terminal device downloads corresponding webpage template data from the webpage template data storage unit via the middleware server based on the webpage template ID, and the webpage template data saving unit stores the webpage template data downloaded by the webpage template downloading unit associatively with the corresponding webpage template ID.

As a preferred embodiment of the present invention, the webpage template downloading unit of the terminal device can download the corresponding webpage template data from the webpage template data storage unit via the middleware server based on the webpage template ID after the webpage is displayed, and the webpage template data is downloaded intelligently when the network is idle or in the case of wifi, which can avoid occupying the bandwidth and improve users' browsing experience.

In the case that the terminal device has no matched webpage template locally, the middleware server sends recommended webpage template data to the terminal device when the network is idle, so that it is convenient to directly call the webpage template when the terminal device needs to use the webpage template once again, which not only reduces occupation of the bandwidth but also increases the browsing speed and improves user experience.

In the present invention, in step S701 of FIG. 7, a terminal device acquires a browsing request sent by a user, and locally searches for a webpage template matching with a webpage of a webpage browsing request, and if no webpage template is found, the webpage browsing request sent to a middleware server does not include a first template ID list. Not finding the webpage template matching with the webpage browsing request is that the terminal device does not locally store any webpage template matching with the webpage of the webpage browsing request. At this point, the present invention further includes a step of searching for and downloading a webpage template from a webpage template server by the terminal device through the middleware server.

Figure 18A:
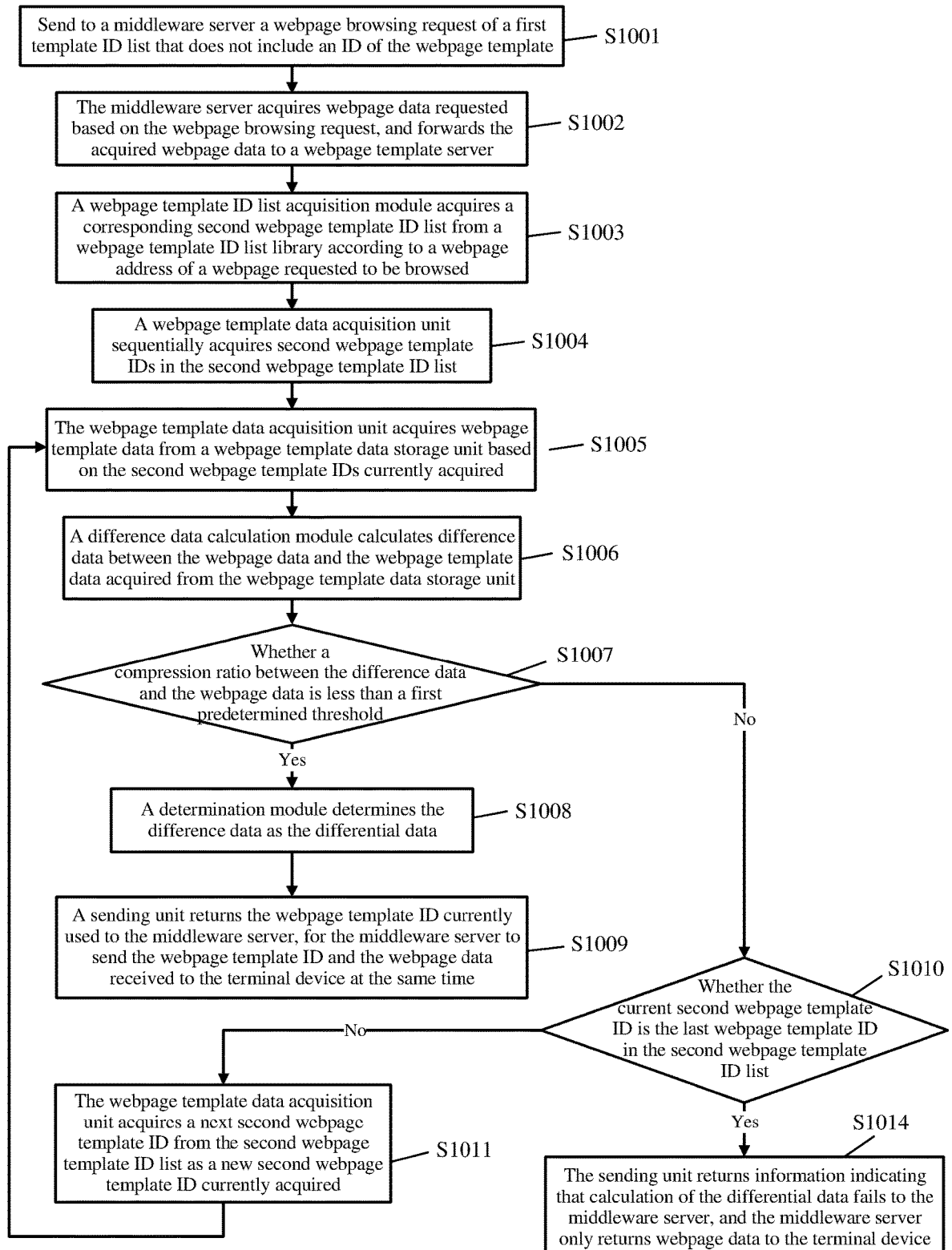
FIG. 18a and FIG. 18b are flow charts of a process of acquiring webpage template data by a terminal device in the method of implementing webpage display by using a webpage template according to the present invention.
Figure 18B:
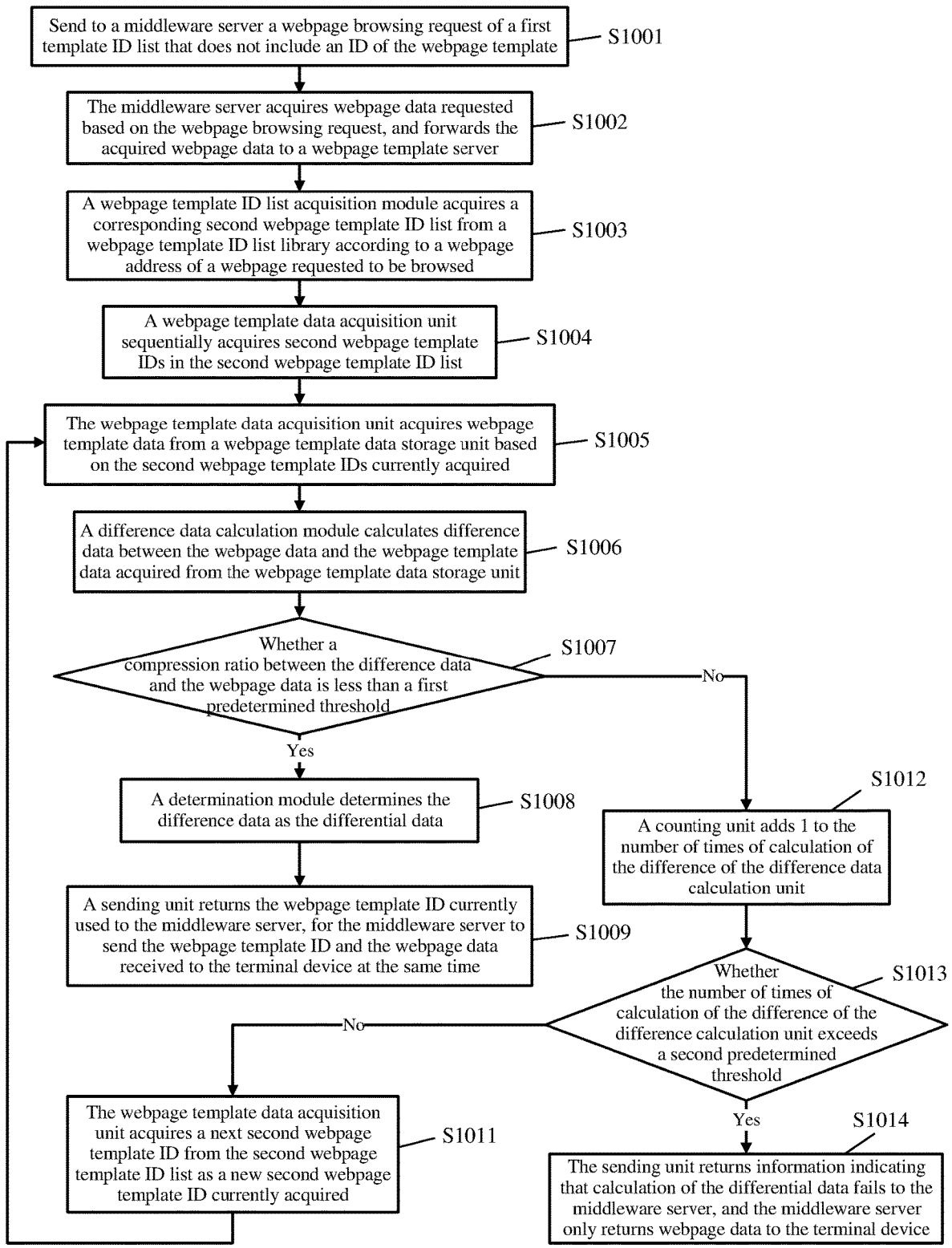

FIG. 18 is a flow chart of a second embodiment of step S703 in the case that a webpage browsing request includes a first webpage template ID list in the method of implementing webpage display by using a webpage template according to the present invention.

After the terminal device cannot locally find any webpage template matching with the webpage of the webpage browsing request, as shown in FIG. 18, the present invention further includes step S1001 of sending to a middleware server a webpage browsing request of a first template ID list that does not include an ID of the webpage template.

Step S1002. After receiving the webpage browsing request sent by the terminal device, the middleware server acquires webpage data requested based on the webpage browsing request, and forwards the acquired webpage data to a webpage template server.

Step S1003. A webpage template ID list acquisition unit acquires a corresponding second webpage template ID list from a webpage template ID list library according to a webpage address of a webpage requested to be browsed. The second webpage template ID list is stored associatively with the webpage address in the webpage template ID list library.

The method proceeds to step S1004, in which a webpage template data acquisition unit sequentially acquires second webpage template IDs in the second webpage template ID list, and then proceeds to step S1005, in which the webpage template data acquisition unit acquires webpage template data from a webpage template data storage unit based on the second webpage template IDs currently acquired.

Then, in step S1006, a difference data calculation module calculates difference data between the webpage data and the webpage template data acquired from the webpage template data storage unit.

Then, in step S1007, whether a compression ratio between the difference data and the webpage data is less than a first predetermined threshold is judged.

When the compression ratio between the calculated difference data and the webpage data is less than the first predetermined threshold, the method proceeds to step S1008, in which a determination module determines the difference data as the differential data, and then proceeds to step S1009, in which a sending unit returns the webpage template ID currently used to the middleware server, for the middleware server to send the webpage template ID and the webpage data received to the terminal device at the same time.

Then, a webpage template downloading unit of the terminal device downloads corresponding webpage template data from the webpage template data storage unit via the middleware server based on the webpage template ID, and the webpage template data saving unit saves the webpage template data downloaded by the webpage template downloading unit associatively with the corresponding webpage template ID.

As a preferred embodiment of the present invention, the webpage template downloading unit of the terminal device can download the corresponding webpage template data from the webpage template data storage unit via the middleware server based on the webpage template ID after the webpage is displayed, and the webpage template data is downloaded intelligently when the network is idle or in the case of wifi, which can avoid occupying the bandwidth and improve users' browsing experience.

In the case that the terminal device has no matched webpage template locally, the middleware server sends recommended webpage template data to the terminal device when the network is idle, so that it is convenient to directly call the webpage template when the terminal device needs to use the webpage template once again, which not only reduces occupation of the bandwidth but also increases the browsing speed and improves user experience.

When the compression ratio between the calculated difference data and the webpage data is not less than the first predetermined threshold, the method proceeds to step S1010, in which whether the current second webpage template ID is the last webpage template ID in the second webpage template ID list is judged. If no, the method proceeds to step S1011, in which the webpage template data acquisition unit acquires a next second webpage template ID from the second webpage template ID list as a new second webpage template ID currently acquired, and then the method goes back to step S1005. If yes, the method proceeds to step S1014, in which the sending unit returns information indicating that calculation of the differential data fails to the middleware server, the middleware server only returns webpage data to the terminal device, and the process ends.

In order to prevent that the number of the webpage template IDs in the second webpage template ID is too much to result in a too large calculation quantity of the webpage template server, as a preferred embodiment, step S1010 of this embodiment can be replaced with S1012 and S1013, step S1012 is adding, by a counting unit, 1 to the number of times of calculation of the difference of the difference data calculation unit, and then, in step S1013, whether the number of times of calculation of the difference of the difference calculation unit exceeds a second predetermined threshold is judged. When the number of times of calculation does not exceed the second predetermined threshold, the method proceeds to step S1011. When the number of times of calculation exceeds the second predetermined threshold, the method proceeds to step S1014.

As a preferred embodiment of the present invention, the method, before steps S811, S913 and S1014, further includes: a webpage template data generation unit is configured to generate webpage template data according to the webpage data sent from the middleware server, generating a corresponding webpage template ID, storing the webpage template data and the webpage template ID correspondingly into the webpage template data storage unit, and storing the webpage template ID and a webpage address correspondingly into the webpage template ID list library. The webpage template data generation unit is configured to generate webpage template data according to the webpage data sent from the middleware server, and the webpage template data is rapidly generated by using a specific algorithm, which may specifically be generated with a method of generating a hash value for a webpage or a method of line-breaking webpage data. As the webpage template may be a webpage, it is also feasible to use the webpage data per se as webpage template data.

Definitely, in the present invention, the time of generating a webpage template is not limited to before steps S811, S913 and S1014, which may also be before the present invention, and the webpage template server generates the webpage template data in advance by receiving the webpage data forwarded by the middleware server. In the method that the webpage template server generates the webpage template data in advance by receiving the webpage data forwarded by the middleware server, as there are lots of webpages accessed through a middleware every day and the webpage template server can receive webpage data of multiple middleware servers, the webpage template server receives a large amount of webpage data from the middleware servers. In the embodiment of the present invention, it is necessary to store the large amount of data and it is necessary to carry out a large number of operations on the large amount of webpage data to generate a webpage template. Therefore, in the embodiment of the present invention, it is feasible to store and calculate data by using a Hadoop (distributed system infrastructure) cluster. That is, the webpage template server is a server cluster and consists of multiple servers. The webpage template data generation unit may be disposed in the multiple servers of the server cluster. The server cluster uses a Hadoop-based HBase (distributed, column-oriented open source database) database to store webpage data, template data, template indexes and so on. The webpage template data is generated by using a MapReduce (large-scale data set concurrent operation method) computing framework. The Hadoop cluster is a natural distributed storage and computing framework. It is only necessary to increase the number of servers that generate webpage templates in the webpage template server, that is, increase the number of the server that includes the webpage template data generation unit, and the cluster can be horizontally expanded, which has good disaster tolerance capability.

In consideration of the storage capability of the terminal device, the number of the webpage templates locally stored by the terminal device or the total size of the webpage template data is limited, and it is feasible to set a threshold, for example, only 100 templates can be stored at most and the total size does not exceed 10 MB. In the webpage display method of the present invention, a step of eliminating webpage template data of the terminal device may be further included. For example, if it exceeds the threshold, it is feasible to eliminate templates according to LRU (Least Recently Used), that is, a LRU page replacement algorithm. By using the LRU algorithm, it is feasible to delete webpage templates that have been used less recently and will not be used in a longer time in the future, which can save storage resources of the terminal device.

Similarly in consideration of the storage capability of the webpage template server, in the webpage display method of the present invention, a step of eliminating webpage template data of the webpage template server may also be included.

A program configured to perform the method of generating a webpage template according to the embodiment of the present invention may be stored in a computer readable storage medium. Thus, in an embodiment of the present invention, a computer readable storage medium is further provided, wherein a program configured to perform the method of generating a webpage template according to the embodiment of the present invention is stored in the computer readable storage medium. Correspondingly, in one embodiment of the present invention, a computer readable medium having a processor executable program code is provided, when being executed, the program code causing a processor to perform the following steps of: collecting webpage data of a webpage; generating a webpage template of the webpage according to the webpage data; and generating a template index according to the generated webpage template.

In addition, typically, the mobile terminal in the present invention may be various handheld terminal devices, for example, a mobile phone, a Personal Digital Assistant (PDA) and the like, and thus the protection scope of the present invention should not be limited to a certain particular type of mobile terminals.

In addition, the method according to the present invention may also be implemented as a computer program executed by a CPU. When the computer program is executed by the CPU, the functions defined in the method of the present invention are performed.

In addition, the steps of the method and the system units may also be implemented by using a controller and a computer readable storage device configured to store a computer program that causes the controller to implement the steps or the functions of the units.

In addition, it should be understood that the computer readable storage device (for example, memory) herein may be a volatile memory or a non-volatile memory, or may include both the volatile memory and the non-volatile memory. As an example instead of being limitative, the non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM), and the RAM can serve as an external cache memory. As an example instead of being limitative, the RAM may be obtained in many forms, for example, a synchronous RAM (DRAM), a dynamic RAM (DRAM), a synchronous DRAM (SDRAM), a double data rate SDRAM (DDR SDRAM), an enhanced SDRAM (ESDRAM), a synchronization link DRAM (SLDRAM) and a direct Rambus RAM (DRRAM). The storage device disclosed is intended to, but not limited to, these and other suitable types of memories.

Various exemplary logic blocks, units and circuits described in combination with the disclosure herein can be implemented or executed by using the following members designed to be used to execute the following functions: a general-purpose processor, a digital signal processor (DSP), an Application Specific Integrated Circuit (ASIC), a Field Programmable Gate Array (FPGA) or other programmable logic devices, a separate gate or transistor logic, a separate hardware component or any combination of the members. The general-purpose processor may be a microprocessor, but alternatively, the processor may be any traditional processor, a controller, a microcontroller or a state machine. The processor may also be implemented as a combination of computing devices, for example, a combination of a DSP and a microprocessor, multiple microprocessors, one or more microprocessors in combination with a DSP core, or any other such configuration.

The steps of the method or algorithm described in combination with the disclosure herein may be directly included in hardware, in a processor-executed software unit or a combination thereof. The software unit may reside in an RAM memory, a flash memory, an ROM memory, an EPROM memory, an EEPROM memory, a register, a hard disk, a removable disk, a CD-ROM, or any other forms of storage mediums known in this field. An exemplary storage medium is coupled to the processor, enabling the processor to read information from the storage medium or to write information into the storage medium. In an alternate scheme, the storage medium may be integrated to the processor. The processor and the storage medium may reside in the ASIC. The ASIC may reside in a user terminal. In an alternate scheme, the processor and the storage medium may reside in the user terminal as separate components.

In one or more exemplary designs, the functions may be implemented in hardware, software, firmware or any combination thereof. If the functions are implemented in software, it is feasible to use the functions as one or more instructions or code to be stored on a computer readable medium or to be transmitted through the computer readable medium. The computer readable medium includes a computer storage medium and a communication medium, and the communication medium includes any medium that helps to transmit a computer program from one position to another position. The storage medium may be any available medium accessible to a general or dedicated computer. As an example instead of being limitative, the computer readable medium may include an RAM, an ROM, an EEPROM, a CD-ROM or other optical disk storage devices, a magnetic disk storage device or other magnetic storage devices, or may be any other medium used for carrying or storing required program code in the form of instructions or data structures and accessible to a general or dedicated computer or a general or dedicated processor. In addition, any connection can be properly referred to as a computer readable medium. For example, if software is sent from a website, a server or another remote source by using a co-axial cable, a fiber-optic cable, a twisted pair cable, a digital subscriber line (DSL) or a wireless technology such as infrared, radio and microwaves, the co-axial cable, the fiber-optic cable, the twisted pair cable, the DSL or the wireless technology such as infrared, radio and microwaves are all included in the definition of the medium. As used herein, a magnetic disk and an optical disk include a compact disk (CD), a laser disk, an optical disk, a digital versatile disc (DVD), a floppy disk and a blue-ray disk, wherein the magnetic disk generally magnetically reproduces data, while the optical disk optically reproduces data by using laser. A combination of the aforementioned contents should also be included in the range of the computer readable medium.

Apparently, persons skilled in the art should understand that respective modules or respective steps of the present invention can be implemented by using a general computing device, they can be integrated onto a single computing device or distributed on a network made up of multiple computing devices, optionally, they can be implemented by using program code that can be executed by a computing device, and thus it is feasible to store them in a storage device to be executed by a computing device, or make them respectively into various integrated circuit modules, or make multiple modules or steps in them into a single integrated circuit module for implementation. In this way, the present invention is not limited to any particular combination of hardware and software.

The above are merely preferred embodiments of the present invention, but are not used to limit the present invention; for persons skilled in the art, the present invention may have a variety of alterations and changes. Any modification, equivalent replacement, improvement and the like within the spirit and principle of the present invention should be included in the protection scope of the present invention.

The invention claimed is:

1. A non-transitory machine-readable storage medium encoded with instructions executable by a hardware processor of a template server to perform a method comprising:
   collecting first webpage data of a webpage;
   generating a webpage template of the webpage according to the first webpage data, the webpage template enabling generation of the webpage according to first differential data existing in the first webpage data but not existing in the webpage template;
   generating a template index according to the generated webpage template;
   sending the webpage template to a terminal device, wherein the terminal device stores the webpage template;
   receiving a request for the webpage from the terminal device subsequent to sending the webpage template to the terminal device and generating the template index;
   responsive to receiving the request for the webpage:
      acquiring second webpage data of the requested webpage;
      releasing the webpage template and the template index for multiple webpage template servers that provide webpage templates, for enabling at least one of the multiple webpage template servers to retrieve the webpage template using the template index and provide the webpage template in response to the request for the webpage, the releasing further comprising:
         after multiple webpage templates and template indices thereof are generated:
            calculating an overall difference rate of a set of the multiple webpage templates and a set of historical templates;

judging whether the overall difference rate is greater than a preset overall difference rate threshold;

in response to judging that the overall difference rate is greater than the preset overall difference rate threshold, releasing the webpage template and the template index; and in response to judging that the overall difference rate is not greater than the preset overall difference rate threshold, not releasing the webpage template and the template index;

generating second differential data existing in the second webpage data but not existing in the webpage template; and forwarding the second differential data to the terminal device, wherein the terminal device generates and displays the requested webpage according to the second differential data and the webpage template stored by the terminal device.

2. The medium of claim 1, wherein:

each of the multiple webpage templates has a respective webpage template ID;

the request for the webpage includes one of the webpage template IDs; and the method further comprises acquiring the webpage template based on the one of the webpage template IDs.

3. The medium of claim 1, the method further comprising:

retrieving, by a first webpage template server of the multiple template servers, the webpage template matching with the webpage by using the template index; and providing the webpage template matching with the webpage for other webpage template servers in the multiple template servers than the first webpage template server.

4. The medium of claim 1, wherein the generating a template index according to the generated webpage template comprises:

selecting a webpage template of which a quality satisfies a predetermined quality condition;

determining URL paths applicable to each of the plurality of webpage templates;

selecting, from the URL paths, a URL path applicable to the webpage template of which the quality satisfies the predetermined quality condition; and converting the selected path to a template index.

5. The medium of claim 1, wherein, after generating the webpage template of the webpage according to the webpage data, the method further comprises:

judging whether a number of the multiple webpage templates reaches a preset number;

if it is judged that the number of the multiple webpage templates reaches the preset number, calculating a coverage rate of each webpage template;

comparing a webpage template of which the coverage rate is less than a first preset coverage rate threshold with a webpage template of which the coverage rate is greater than the first preset coverage rate threshold; and if a difference rate between the webpage template of which the coverage rate is less than the first preset coverage rate threshold and the webpage template of which the coverage rate is greater than the first preset coverage rate threshold is less than a preset difference rate threshold, merging the webpage template of which the coverage rate is less than the first preset coverage rate threshold with the webpage template of which the coverage rate is greater than the first preset coverage rate threshold.

6. The medium of claim 5, wherein the comparing the webpage template of which the coverage rate is less than the first preset coverage rate threshold with the webpage template of which the coverage rate is greater than the first preset coverage rate threshold comprises:

sorting the multiple webpage templates according to the respective sizes of the coverage rates in a descending order; and comparing each of the multiple webpage templates with a webpage template sorted in front of it.

7. The medium of claim 1, the method further comprising:

storing, after the webpage template of the webpage is generated according to the webpage data, the multiple webpage templates;

calculating a coverage rate of each of the multiple webpage templates;

judging whether the sum of the coverage rates of the multiple webpage templates under each path reaches a second preset coverage rate threshold; and deleting webpage templates under a path where the sum of the coverage rates of the multiple webpage templates does not reach the second preset coverage rate threshold.

8. The medium of claim 1, the method further comprising:

in response to similar or identical webpage templates being generated, reserving one of the identical or similar webpage templates based on a relative frequency of use of the similar or identical webpage templates and deleting others of the identical or similar webpage templates.

9. A non-transitory machine-readable storage medium encoded with instructions executable by a hardware processor of a terminal device to perform a method comprising:

receiving a webpage template of a webpage from a middleware server, the webpage template enabling generation of the webpage according to first differential data existing in first webpage data of the webpage, but not existing in the webpage template;

wherein:

a template index is generated, by a template server, according to a generated webpage template prior to receiving a request for the webpage from the terminal device; and the webpage template and the template index are released, by the template server, for multiple webpage template servers that provide webpage templates, for enabling at least one of the multiple webpage template servers to retrieve the webpage template using the template index and provide the webpage template in response to the request for the webpage, the releasing further comprising:

after multiple webpage templates and template indices thereof are generated:

calculating an overall difference rate of a set of the multiple webpage templates and a set of historical templates;

judging whether the overall difference rate is greater than a preset overall difference rate threshold;

in response to judging that the overall difference rate is greater than the preset overall difference rate threshold, releasing the webpage template and the template index; and in response to judging that the overall difference rate is not greater than the preset overall difference rate threshold, not releasing the webpage template and the template index;

sending a request for the webpage to the middleware server subsequent to receiving the webpage template of the webpage, wherein the middleware server, responsive to receiving the request for the webpage:
  acquires second webpage data of the requested webpage;
  forwards the acquired second webpage data to one of the template servers;
  receives second differential data from one of the template servers;
  transmits the second differential data existing in the second webpage data but not existing in the webpage template to the terminal device;
receiving the second differential data; and
generating and displaying the webpage according to the second differential data and the webpage template.

10. The medium of claim 9, the method further comprising:
storing the multiple webpage templates, each having a respective webpage template ID;
identifying the webpage template ID for the webpage; and
including the webpage template ID for the webpage in the request for the webpage, wherein the middleware server acquires the webpage template based on the webpage template ID for the webpage in the request for the webpage.

11. The medium of claim 10, the method further comprising:
storing a webpage template ID list of the webpage template IDs for the plurality of the webpage templates stored in the terminal device;
receiving a webpage template ID not belonging to the webpage template ID list from the middleware server; and
downloading a webpage template corresponding to the webpage template ID not belonging to the webpage template ID list.

12. A non-transitory machine-readable storage medium encoded with instructions executable by a hardware processor of a webpage template server to perform a method comprising:
collecting first webpage data of a webpage;
generating a webpage template of the webpage according to the first webpage data, the webpage template enabling generation of the webpage according to first differential data existing in the first webpage data but not existing in the webpage template;
generating a template index according to the webpage template prior to receiving a request for the webpage, the generating a template index comprising:
  selecting, from webpage templates of the webpage template server, a webpage template having a template quality condition that satisfies a predetermined quality condition;
  determining URL paths applicable to each of webpage templates;
  selecting, from the URL paths, a URL path applicable to the webpage template having the template quality condition that satisfies the predetermined quality condition; and
  converting the selected URL path to a template index;
sending the webpage template to a terminal device, wherein the terminal device stores the webpage template;
releasing the webpage template and the template index to multiple webpage template servers that provide webpage templates, for enabling at least one of the multiple webpage template servers to retrieve the webpage template using the template index and provide the webpage template in response to a request for the webpage; and
responsive to a request for the webpage from the terminal device, generating second differential data and transmitting the second differential data to a middleware server,
wherein the middleware server forwards the second differential data to the terminal device, and
wherein the terminal device generates and displays the requested webpage according to the second differential data and the webpage template stored by the terminal device.

13. The medium of claim 12, the method further comprising:
retrieving the webpage template matching with the webpage by using the template index, and providing the webpage template matching with the webpage to other webpage template servers.

14. The medium of claim 12, the method further comprising:
after multiple webpage templates and template indexes thereof are generated;
calculating an overall difference rate of a set of the multiple webpage templates and a set of historical templates;
judging whether the overall difference rate is greater than a preset overall difference rate threshold;
in response to judging that the overall difference rate is greater than the preset overall difference rate threshold, releasing the webpage template and the template index; and
in response to judging that the overall difference rate is not greater than the preset overall difference rate threshold, not releasing the webpage template and the template index.

15. The medium of claim 12, the method further comprising:
judging, after the webpage template of the webpage is generated according to the webpage data, whether a number of webpage templates reaches a preset number;
calculating, in response to judging that the number of the webpage templates reaches the preset number, a coverage rate of each of the webpage templates;
comparing a webpage template of which the coverage rate is less than a first preset coverage rate threshold with a webpage template of which the coverage rate is greater than the first preset coverage rate threshold; and
merging, if a difference rate between the webpage template of which the coverage rate is less than the first preset coverage rate threshold and the webpage template of which the coverage rate is greater than the first preset coverage rate threshold is less than a preset difference rate threshold, the webpage template of which the coverage rate is less than the first preset coverage rate threshold with the webpage template of which the coverage rate is greater than the first preset coverage rate threshold.

16. The medium of claim 15, the method further comprising:
sorting the webpage templates according to the respective sizes of the coverage rates in a descending order; and
comparing a webpage template sorted in the back with a webpage template sorted in the front.

17. The medium of claim 12, the method further comprising:

storing, after the webpage template of the webpage is generated according to the webpage data, webpage templates;

calculating a coverage rate of each of the webpage templates;

judging whether the sum of the coverage rates of the webpage templates under each path reaches a second preset coverage rate threshold; and deleting webpage templates under a path where the sum of the coverage rates of the webpage templates does not reach the second preset coverage rate threshold.

* * * * *